(12) United States Patent
Zhou et al.

(10) Patent No.: US 12,108,375 B2
(45) Date of Patent: Oct. 1, 2024

(54) TRANSMISSION METHOD AND APPARATUS

(71) Applicant: HUAWEI TECHNOLOGIES CO., LTD., Guangdong (CN)

(72) Inventors: Jianwei Zhou, Hangzhou (CN); Chenlei Xu, Hangzhou (CN); Hejia Luo, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 17/704,555

(22) Filed: Mar. 25, 2022

(65) Prior Publication Data
US 2022/0225332 A1 Jul. 14, 2022

Related U.S. Application Data

(63) Continuation of application No. PCT/CN2020/113912, filed on Sep. 8, 2020.

(30) Foreign Application Priority Data

Sep. 26, 2019 (CN) .......................... 201910919509.9

(51) Int. Cl.
*H04W 72/0453* (2023.01)
*H04W 72/20* (2023.01)

(52) U.S. Cl.
CPC ....... *H04W 72/0453* (2013.01); *H04W 72/20* (2023.01)

(58) Field of Classification Search
CPC ... H04L 5/0023; H04L 5/0094; H04L 5/0073; H04W 72/0453; H04W 72/20; H04B 7/0617
See application file for complete search history.

(56) References Cited

U.S. PATENT DOCUMENTS

| | | | |
|---|---|---|---|
| 2013/0114756 A1* | 5/2013 | Jia .......................... | H04L 5/0048 375/295 |
| 2014/0211892 A1* | 7/2014 | Guo .................... | H04L 25/0212 375/350 |

(Continued)

FOREIGN PATENT DOCUMENTS

| CN | 101473619 A | 7/2009 |
|---|---|---|
| CN | 107222442 A | 9/2017 |

(Continued)

OTHER PUBLICATIONS

Extended European Search Report issued in European Application No. 20869257.4 on Sep. 27, 2022, 8 pages.

(Continued)

*Primary Examiner* — Syed Ali
(74) *Attorney, Agent, or Firm* — Fish & Richardson P.C.

(57) ABSTRACT

The disclosure provides transmission methods and apparatuses. One example includes sending control signaling to a terminal device, to indicate the terminal device to send a physical uplink shared channel (PUSCH) on a first frequency band; and receiving the PUSCH sent by the terminal device on the first frequency band. The first frequency band includes at least one guard subcarrier. A quantity of the at least one guard subcarrier is determined based on a Doppler frequency shift of a beam covering the terminal device. The first frequency band is located on a frequency band corresponding to the beam.

16 Claims, 11 Drawing Sheets

(56) References Cited

U.S. PATENT DOCUMENTS

| | | | |
|---|---|---|---|
| 2015/0282140 A1* | 10/2015 | Ezaki | H04L 27/2657 |
| | | | 370/330 |
| 2018/0241464 A1 | 8/2018 | Michaels | |
| 2018/0316468 A1* | 11/2018 | Kishiyama | H04W 72/04 |
| 2021/0385826 A1* | 12/2021 | Moon | H04L 1/00 |
| 2022/0132593 A1* | 4/2022 | Ren | H04W 56/0045 |
| 2022/0216912 A1* | 7/2022 | Hu | H04B 7/1855 |

FOREIGN PATENT DOCUMENTS

| | | |
|---|---|---|
| CN | 107431991 A | 12/2017 |
| WO | 2019038832 A1 | 2/2019 |

OTHER PUBLICATIONS

LG Electronics, "Discussion on NR PRACH Preamble format details," 3GPP TSG RAN WG1 Meeting NR#2, R1-1710268, Qingdao, P.R. China, Jun. 27-30, 2017, 6 pages.

PCT International Search Report and Written Opinion issued in International Application No. PCT/CN2020/113912 on Dec. 9, 2020, 13 pages (with English translation).

* cited by examiner

TRANSMISSION METHOD AND APPARATUS

CROSS-REFERENCE TO RELATED APPLICATIONS

This application is a continuation of International Patent Application No. PCT/CN2020/113912, filed on Sep. 8, 2020, which claims priority to Chinese Patent Application No. 201910919509.9, filed on Sep. 26, 2019. The disclosures of the aforementioned applications are hereby incorporated by reference in their entireties.

TECHNICAL FIELD

Embodiments of this application relate to the communication field, and in particular, to a transmission method and apparatus.

BACKGROUND

In a new radio (NR) standard, because strict orthogonality cannot be implemented between a physical random access channel (PRACH) and a physical uplink shared channel (PUSCH), if the PUSCH and the PRACH are sent on adjacent frequency bands, inter-carrier interference is caused between the PUSCH and the PRACH, thereby affecting performance of the PUSCH and the PRACH. Therefore, in the NR standard, data interference is avoided by using a "guard bandwidth" for the PRACH.

However, with development of non-terrestrial communication, the guard bandwidth specified in the NR standard cannot meet a current communication requirement. Therefore, how to determine a proper value of the guard bandwidth becomes a problem that needs to be urgently resolved.

SUMMARY

This application provides a transmission method and apparatus, to resolve a problem that a guard bandwidth does not meet a requirement in an NR standard.

To achieve the foregoing objective, the following technical solutions are used in this application.

According to a first aspect, an embodiment of this application provides a transmission method. The method includes: Abase station sends control signaling to a terminal device, to indicate the terminal device to send a PUSCH on a first frequency band. Then, the base station may receive the PUSCH sent by the terminal device on the first frequency band. The first frequency band includes at least one guard subcarrier. A quantity of the at least one guard subcarrier is determined based on a Doppler frequency shift of a beam covering the terminal device.

In the foregoing manner, in this application, a quantity of guard subcarriers corresponding to a beam may be determined based on Doppler frequency shifts of different beams. Therefore, a manner of determining a proper guard bandwidth is proposed, to reduce interference between a PUSCH and a PRACH and meet a communication requirement of a non-terrestrial communication system.

In a possible implementation, a frequency band to which the first frequency band belongs includes m guard bands. The guard bands each include the same quantity of guard subcarriers. At least one guard band in the m guard bands comprises the at least one guard subcarrier.

In the foregoing manner, the following is implemented: The base station may allocate the frequency band including the at least one guard band to the corresponding terminal.

In a possible implementation, the method further includes: The base station may obtain guard subcarrier information corresponding to the beam, and send the guard subcarrier information to the terminal device. The guard subcarrier information is used to indicate the quantity of guard subcarriers included in the guard band.

In the foregoing manner, the following is implemented: The base station may notify the terminal of the guard subcarrier information corresponding to the beam covering the terminal, so that the terminal sends the PUSCH on a resource other than the guard subcarrier in the first frequency band based on the guard subcarrier information of the beam.

In a possible implementation, obtaining the guard subcarrier information corresponding to the beam includes: The base station obtains the Doppler frequency shift of the beam, and obtains, based on the Doppler frequency shift of the beam, the quantity of guard subcarriers included in the guard band.

In the foregoing manner, the following is implemented: The base station may determine, based on the Doppler frequency shift of the beam, the quantity of guard subcarriers included in the guard band.

In a possible implementation, obtaining, based on the Doppler frequency shift of the beam, the quantity of guard subcarriers included in the guard band includes: obtaining a Doppler frequency shift of each of k beams in a set to which the beam belongs, where k is an integer greater than or equal to 1; and calculating, based on a maximum value in the Doppler frequency shifts corresponding to the k beams in the set, the quantity of guard subcarriers included in the guard band.

In the foregoing manner, optionally, the base station may calculate, based on the Doppler frequency shift of each beam, the quantity of guard subcarriers included in the guard band of the beam; or optionally, the base station may calculate, based on the maximum value in the Doppler frequency shifts corresponding to the set, the quantity of guard subcarriers included in the guard band of the beam.

In a possible implementation, if the base station is a non-terrestrial base station, obtaining the Doppler frequency shifts corresponding to the k beams in the set to which the beam belongs includes: obtaining height information of the base station and beam information of each of the k beams, where the beam information includes at least one of the following: a beam location, a beam coverage radius, and a beam center frequency, and the beam location is used to describe longitude and latitude of the beam; and calculating, based on the height information and the beam information, the Doppler frequency shift corresponding to each of the k beams.

In the foregoing manner, the following is implemented: The base station may calculate different Doppler frequency shifts based on different beams, and obtain a quantity of guard subcarriers included in a corresponding guard band.

In a possible implementation, the base station may calculate the Doppler frequency shift of the beam according to the following formulas:

$$D = \sqrt{r_E^2 + (h+r_E)^2 - 2 \cdot r_E \cdot (h+r_E) \cdot \cos\alpha}$$

$$\frac{D}{dt} = V = \frac{r_E \cdot (h+r_E) \cdot \sin\alpha}{\sqrt{r_E^2 + (h+r_E)^2 - 2 \cdot r_E \cdot (h+r_E) \cdot \cos\alpha}} \cdot \frac{d\alpha}{dt}$$

-continued $$\omega_s = \frac{d\alpha}{dt} = \sqrt{\frac{\mu}{(r_E + h)^3}}$$

$$d_r = 2 \cdot \left(\frac{V_{max}}{c} - D_C\right) \cdot f_c$$

Herein, d is a distance between an edge of a beam coverage region and the base station, h is a height of the base station from the ground, $r_E$ is a radius of the earth, α is a geocentric angle between the base station and the edge of the beam coverage region, V is a relative velocity between the base station and the terminal, $\omega_s$ is an angular velocity of the base station, $\mu=3.986\times10^5$ km$^3$/s$^2$ is a Kepler constant, $d_r$ is the Doppler frequency shift, $f_c$ is the beam center frequency, and $D_C$ is a Doppler pre-compensation value.

In a possible implementation, the base station may calculate the quantity n of guard subcarriers included in the guard band according to the following formula:

$$n = d_{r\,max} / \Delta f_{pusch} \quad (5)$$

Herein, $\Delta f_{pusch}$ is a subcarrier spacing of the PUSCH, and $D_{r\,max}$ is the maximum value in the Doppler frequency shifts corresponding to the k beams.

In a possible implementation, if the beam location does not change with a movement of the base station, the method further includes: if a preset condition is triggered, sending the guard subcarrier information to the terminal device.

In the foregoing manner, for a non-gaze satellite, that is, a satellite whose beam location does not change with a movement of the satellite, the satellite may obtain, based on a change of a parameter such as a beam angle, the quantity of guard subcarriers included in the guard band corresponding to the beam; and send the updated guard subcarrier information to the terminal device after the preset condition is triggered. In other words, the satellite can implement a dynamic allocation manner. In correspondence to different statuses of the beam (that is, a change of a parameter of the beam caused due to a relative movement between the beam and the satellite), the satellite may update the guard subcarrier information corresponding to the different statuses of the beam, and indicate the guard subcarrier information to the terminal device, so that the terminal device can send the PUSCH based on the guard subcarrier information currently corresponding to the beam.

In a possible implementation, before the base station sends the control signaling to the terminal device, the method further includes: The base station detects that a size of a frequency band resource needed by the terminal device is greater than a threshold, and determines to allocate the first frequency band including the at least one subcarrier to the terminal device.

In the foregoing manner, a scheduling manner is implemented. The base station may determine, based on the frequency band resource needed by the terminal device, whether to allocate the frequency band including the guard subcarrier to the terminal, to effectively reduce a spectral efficiency loss caused due to an increase of guard subcarriers.

According to a second aspect, an embodiment of this application provides a transmission method. The method is applied to a terminal device. The method includes: The terminal device receives a control indication from a base station. The control indication is used to indicate the terminal device to send a PUSCH on a first frequency band. The first frequency band includes at least one guard subcarrier. A quantity of the at least one guard subcarrier is determined based on a Doppler frequency shift of a beam covering the terminal device. The first frequency band is located on a frequency band corresponding to the beam. The terminal device sends the PUSCH on the first frequency band according to the control indication.

In a possible implementation, the frequency band includes m guard bands. Herein, m is an integer multiple of 2. The guard bands each include the same quantity of guard subcarriers. At least one guard band in the m guard bands comprises the at least one guard subcarrier.

In a possible implementation, the method further includes: The terminal device receives guard subcarrier information that corresponds to the beam and that is sent by the base station. The guard subcarrier information is used to indicate the quantity of guard subcarriers included in the guard band.

In a possible implementation, the control indication includes frequency band information of the first frequency band. The frequency band information is used to indicate a location of the first frequency band in the frequency band and a quantity of resource blocks (RB) included in the first frequency band.

In a possible implementation, sending the PUSCH on the first frequency band includes: The terminal device determines, based on the guard subcarrier information and the frequency band information, at least one subcarrier that can be used to send the PUSCH, where the at least one subcarrier is a subcarrier other than the at least one guard subcarrier in the first frequency band; and sends the PUSCH on the at least one subcarrier.

According to a third aspect, an embodiment of this application provides a transmission apparatus. The apparatus includes a memory and a processor. The memory is coupled to the processor. The memory stores program instructions. When the program instructions are run by the processor, the apparatus is enabled to perform the following steps: sending control signaling to a terminal device, to indicate the terminal device to send a PUSCH on a first frequency band; and receiving the PUSCH sent by the terminal device on the first frequency band. The first frequency band includes at least one guard subcarrier. A quantity of the at least one guard subcarrier is determined based on a Doppler frequency shift of a beam covering the terminal device.

In a possible implementation, a frequency band to which the first frequency band belongs includes m guard bands. Herein, m is an integer multiple of 2. The guard bands each include the same quantity of guard subcarriers. At least one guard band in the m guard bands comprises the at least one guard subcarrier.

In a possible implementation, when the program instructions are run by the processor, the apparatus is enabled to perform the following steps: obtaining guard subcarrier information corresponding to the beam, and sending the guard subcarrier information to the terminal device. The guard subcarrier information is used to indicate the quantity of guard subcarriers included in the guard band.

In a possible implementation, when the program instructions are run by the processor, the apparatus is enabled to perform the following steps: obtaining the Doppler frequency shift of the beam, and obtaining, based on the Doppler frequency shift of the beam, the quantity of guard subcarriers included in the guard band.

In a possible implementation, when the program instructions are run by the processor, the apparatus is enabled to perform the following steps: obtaining a Doppler frequency shift of each of k beams in a set to which the beam belongs, where k is an integer greater than or equal to 1; and calculating, based on a maximum value in the Doppler frequency shifts corresponding to the k beams in the set, the quantity of guard subcarriers included in the guard band.

In a possible implementation, if the base station is a non-terrestrial base station, when the program instructions are run by the processor, the apparatus is enabled to perform the following steps: obtaining height information of the base station and beam information of each of the k beams, where the beam information includes at least one of the following: a beam location, a beam coverage radius, and a beam center frequency, and the beam location is used to describe longitude and latitude of the beam; and calculating, based on the height information and the beam information, the Doppler frequency shift corresponding to each of the k beams.

In a possible implementation, when the program instructions are run by the processor, the apparatus is enabled to calculate the Doppler frequency shift of the beam according to the following formulas:

$$D = \sqrt{r_E^2 + (h + r_E)^2 - 2 \cdot r_E \cdot (h + r_E) \cdot \cos\alpha}$$

$$\frac{D}{dt} = V = \frac{r_E \cdot (h + r_E) \cdot \sin\alpha}{\sqrt{r_E^2 + (h + r_E)^2 - 2 \cdot r_E \cdot (h + r_E) \cdot \cos\alpha}} \cdot \frac{d\alpha}{dt}$$

$$\omega_s = \frac{d\alpha}{dt} = \sqrt{\frac{\mu}{(r_E + h)^3}}$$

$$d_r = 2 \cdot \left(\frac{V_{max}}{c} - D_C\right) \cdot f_c$$

Herein, d is a distance between an edge of a beam coverage region and the base station, h is a height of the base station from the ground, $r_E$ is a radius of the earth, α is a geocentric angle between the base station and the edge of the beam coverage region, V is a relative velocity between the base station and the terminal, $\omega_s$ is an angular velocity of the base station, $\mu=3.986\times10^5$ km/s² is a Kepler constant, $d_r$ is the Doppler frequency shift, $f_c$ is the beam center frequency, and $D_C$ is a Doppler pre-compensation value.

In a possible implementation, when the program instructions are run by the processor, the apparatus is enabled to calculate the quantity n of guard subcarriers included in the guard band according to the following formula:

$$n = d_{r\,max} / \Delta f_{pusch}$$

Herein, $\Delta f_{pusch}$ is a subcarrier spacing of the PUSCH, and $d_{r\,max}$ is the maximum value in the Doppler frequency shifts corresponding to the k beams.

In a possible implementation, if the beam location does not change with a movement of the base station, when the program instructions are run by the processor, the apparatus is enabled to perform the following step: if a preset condition is triggered, sending guard subcarrier information to the terminal device.

In a possible implementation, when the program instructions are run by the processor, the apparatus is enabled to perform the following steps: detecting that a size of a frequency band resource needed by the terminal device is greater than a threshold, and determining to allocate the first frequency band including the at least one subcarrier to the terminal device.

In a possible implementation, the memory is integrated with the processor.

According to a fourth aspect, an embodiment of this application provides a transmission apparatus. The apparatus is applied to a terminal device. The apparatus includes a memory and a processor. The memory is coupled to the processor. The memory stores program instructions. When the program instructions are run by the processor, the apparatus is enabled to perform the following steps: receiving a control indication from a base station, where the control indication is used to indicate the terminal device to send a PUSCH on a first frequency band, the first frequency band includes at least one guard subcarrier, a quantity of the at least one guard subcarrier is determined based on a Doppler frequency shift of a beam covering the terminal device, and the first frequency band is located on a frequency band corresponding to the beam; and sending the PUSCH on the first frequency band according to the control indication.

In a possible implementation, the frequency band includes m guard bands. Herein, m is an integer multiple of 2. The guard bands each include the same quantity of guard subcarriers. At least one guard band in the m guard bands comprises the at least one guard subcarrier.

In a possible implementation, when the program instructions are run by the processor, the apparatus is enabled to perform the following step: receiving guard subcarrier information that corresponds to the beam and that is sent by the base station. The guard subcarrier information is used to indicate the quantity of guard subcarriers included in the guard band.

In a possible implementation, the control indication includes frequency band information of the first frequency band. The frequency band information is used to indicate a location of the first frequency band in the frequency band and a quantity of RB included in the first frequency band.

In a possible implementation, when the program instructions are run by the processor, the apparatus is enabled to perform the following steps: determining, based on the guard subcarrier information and the frequency band information, at least one subcarrier that can be used to send the PUSCH, where the at least one subcarrier is a subcarrier other than the at least one guard subcarrier in the first frequency band; and sending the PUSCH on the at least one subcarrier.

In a possible implementation, the memory is integrated with the processor.

According to a fifth aspect, an embodiment of this application provides a transmission apparatus. The apparatus is applied to a base station. The apparatus includes a sending module and a receiving module. The sending module may be configured to send control signaling to a terminal device, to indicate the terminal device to send a PUSCH on a first frequency band. The receiving module may be configured to receive the PUSCH sent by the terminal device on the first frequency band. The first frequency band includes at least one guard subcarrier. A quantity of the at least one guard subcarrier is determined based on a Doppler frequency shift of a beam covering the terminal device.

In a possible implementation, a frequency band to which the first frequency band belongs includes m guard bands. Herein, m is an integer multiple of 2. The guard bands each include the same quantity of guard subcarriers. At least one guard band in the m guard bands comprises the at least one guard subcarrier.

In a possible implementation, the apparatus further includes a processing module, configured to obtain guard subcarrier information corresponding to the beam. The sending module is further configured to send the guard subcarrier information to the terminal device. The guard subcarrier information is used to indicate the quantity of guard subcarriers included in the guard band.

In a possible implementation, the processing module is further configured to: obtain the Doppler frequency shift of the beam, and obtain, based on the Doppler frequency shift of the beam, the quantity of guard subcarriers included in the guard band.

In a possible implementation, the processing module is further configured to: obtain a Doppler frequency shift of each of k beams in a set to which the beam belongs, where k is an integer greater than or equal to 1; and calculate, based on a maximum value in the Doppler frequency shifts corresponding to the k beams in the set, the quantity of guard subcarriers included in the guard band.

In a possible implementation, if the base station is a non-terrestrial base station, that the processing module is further configured to obtain the Doppler frequency shifts corresponding to the k beams in the set to which the beam belongs includes: obtaining height information of the base station and beam information of each of the k beams, where the beam information includes at least one of the following: a beam location, a beam coverage radius, and a beam center frequency, and the beam location is used to describe longitude and latitude of the beam; and calculating, based on the height information and the beam information, the Doppler frequency shift corresponding to each of the k beams.

In a possible implementation, the processing module is further configured to calculate the Doppler frequency shift of the beam according to the following formulas:

$$D = \sqrt{r_E^2 + (h + r_E)^2 - 2 \cdot r_E \cdot (h + r_E) \cdot \cos\alpha}$$

$$\frac{D}{dt} = V = \frac{r_E \cdot (h + r_E) \cdot \sin\alpha}{\sqrt{r_E^2 + (h + r_E)^2 - 2 \cdot r_E \cdot (h + r_E) \cdot \cos\alpha}} \cdot \frac{d\alpha}{dt}$$

$$\omega_s = \frac{d\alpha}{dt} = \sqrt{\frac{\mu}{(r_E + h)^3}}$$

$$d_r = 2 \cdot \left(\frac{V_{max}}{c} - D_C\right) \cdot f_c$$

Herein, d is a distance between an edge of a beam coverage region and the base station, h is a height of the base station from the ground, $r_E$ is a radius of the earth, $\alpha$ is a geocentric angle between the base station and the edge of the beam coverage region, V is a relative velocity between the base station and the terminal in a beam, $\omega_s$ is an angular velocity of the base station, $\mu=3.986\times10^5$ km$^3$/s$^2$ is a Kepler constant, $d_r$ is the Doppler frequency shift, $f_c$ is the beam center frequency, and $D_C$ is a Doppler pre-compensation value.

In a possible implementation, the processing module is further configured to calculate the quantity n of guard subcarriers included in the guard band according to the following formula:

$$n = d_{rmax} / \Delta f_{pusch}$$

Herein, $\Delta f_{pusch}$ is a subcarrier spacing of the PUSCH, and $d_{r\ max}$ is the maximum value in the Doppler frequency shifts corresponding to the k beams.

In a possible implementation, if the beam location does not change with a movement of the base station, the sending module is further configured to: if a preset condition is triggered, send the guard subcarrier information to the terminal device.

In a possible implementation, the processing module is further configured to: detect that a size of a frequency band resource needed by the terminal device is greater than a threshold, and determine to allocate the first frequency band including the at least one subcarrier to the terminal device.

According to a sixth aspect, an embodiment of this application provides a transmission apparatus. The apparatus is applied to a terminal device. The apparatus includes a receiving module and a sending module. The receiving module is configured to receive a control indication from a base station. The control indication is used to indicate the terminal device to send a PUSCH on a first frequency band. The first frequency band includes at least one guard subcarrier. A quantity of the at least one guard subcarrier is determined based on a Doppler frequency shift of a beam covering the terminal device. The first frequency band is located on a frequency band corresponding to the beam. The sending module is configured to send the PUSCH on the first frequency band according to the control indication.

In a possible implementation, the frequency band includes m guard bands. Herein, m is an integer multiple of 2. The guard bands each include the same quantity of guard subcarriers. At least one guard band in the m guard bands comprises the at least one guard subcarrier.

In a possible implementation, the receiving module is further configured to receive guard subcarrier information that corresponds to the beam and that is sent by the base station. The guard subcarrier information is used to indicate the quantity of guard subcarriers included in the guard band.

In a possible implementation, the control indication includes frequency band information of the first frequency band. The frequency band information is used to indicate a location of the first frequency band in the frequency band and a quantity of RB included in the first frequency band.

In a possible implementation, the processing module is configured to determine, based on the guard subcarrier information and the frequency band information, at least one subcarrier that can be used to send the PUSCH. The at least one subcarrier is a subcarrier other than the at least one guard subcarrier in the first frequency band. The sending module is configured to send the PUSCH on the at least one subcarrier.

According to a seventh aspect, an embodiment of this application provides a computer-readable medium, configured to store a computer program. The computer program includes instructions for performing the method according to any one of the first aspect or the possible implementations of the first aspect.

According to an eighth aspect, an embodiment of this application provides a computer-readable medium, configured to store a computer program. The computer program includes instructions for performing the method according to any one of the second aspect or the possible implementations of the second aspect.

According to a ninth aspect, an embodiment of this application provides a computer program. The computer program includes instructions for performing the method according to any one of the first aspect or the possible implementations of the first aspect.

According to a tenth aspect, an embodiment of this application provides a computer program. The computer program includes instructions for performing the method according to any one of the second aspect or the possible implementations of the second aspect.

According to an eleventh aspect, an embodiment of this application provides a chip. The chip includes a processing circuit and a transceiver pin. The transceiver pin and the processing circuit communicate with each other through an internal connection path. The processing circuit performs the method according to any one of the first aspect or the possible implementations of the first aspect, to control a receive pin to receive a signal, and to control a send pin to send a signal.

According to a twelfth aspect, an embodiment of this application provides a chip. The chip includes a processing circuit and a transceiver pin. The transceiver pin and the processing circuit communicate with each other through an internal connection path. The processing circuit performs the method according to any one of the second aspect or the possible implementations of the second aspect, to control a receive pin to receive a signal, and to control a send pin to send a signal.

According to a thirteenth aspect, an embodiment of this application provides a transmission system. The system includes the base station and the terminal device related to the first aspect and the second aspect.

DESCRIPTION OF EMBODIMENTS

The following clearly describes technical solutions in embodiments of this application with reference to accompanying drawings in the embodiments of this application. It is clear that the described embodiments are some but not all of the embodiments of this application. All other embodiments obtained by a person of ordinary skill in the art based on the embodiments of this application without creative efforts shall fall within the protection scope of this application.

The term "and/or" in this specification describes only an association relationship for describing associated objects and represents that three relationships may exist. For example, A and/or B may represent the following three cases: Only A exists, both A and B exist, and only B exists.

In the specification and claims in the embodiments of this application, the terms "first", "second", and the like are intended to distinguish between different objects but do not indicate a particular order of the objects. For example, a first target object, a second target object, and the like are intended to distinguish between different target objects but do not indicate a particular order of the target objects.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the words such as "example" or "for example" is intended to present a related concept in a specific manner.

In the description of the embodiments of this application, unless otherwise stated, "a plurality of" means two or more than two. For example, a plurality of processing units means two or more processing units. A plurality of systems means two or more systems.

To make a person skilled in the art better understand this application, the following briefly describes related technologies related to this application.

(1) First, a guard subcarrier in the conventional technologies is briefly described.

As described above, in an NR standard, because non-orthogonality exists between a PRACH and a PUSCH, if the PUSCH and the PRACH are sent on adjacent frequency bands, relatively large interference is generated between the PRACH and the PUSCH, thereby greatly affecting PRACH detection performance and data channel decoding performance. In the existing NR standard, a method for resolving the foregoing problem is to reserve a guard bandwidth between the PRACH and the PUSCH.

Figure 1:
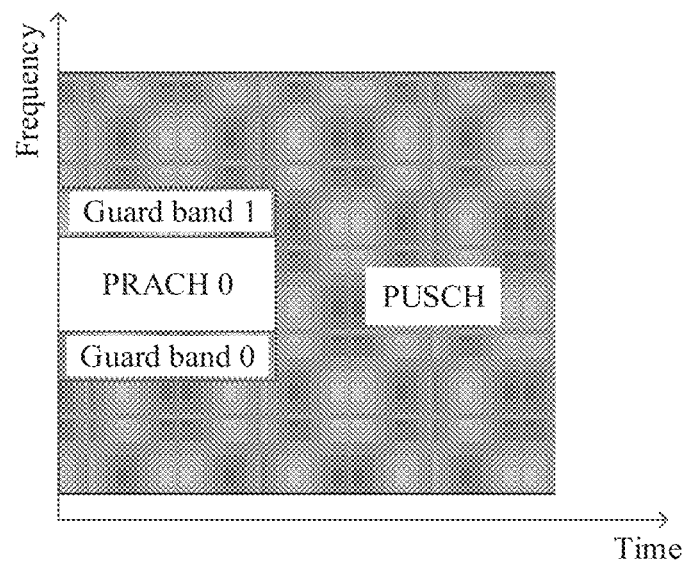
FIG. 1 is a schematic diagram of an example frequency band.

Optionally, structures of guard bandwidths, the PRACH, and the PUSCH may be shown in FIG. 1. Guard bands are disposed at two ends of the PRACH, to reduce interference between the PRACH and the PUSCH. It should be noted that a frequency band occupied by the guard band is a resource of the PUSCH.

Figure 2:
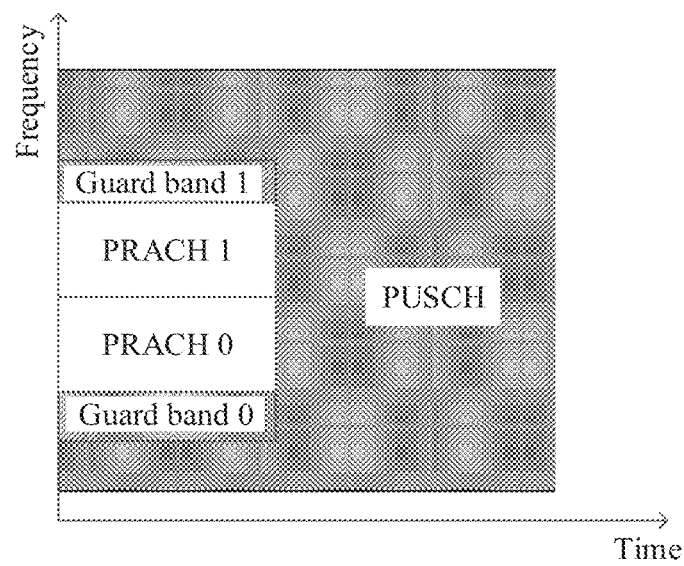
FIG. 2 is a schematic diagram of an example frequency band.
Figure 3:
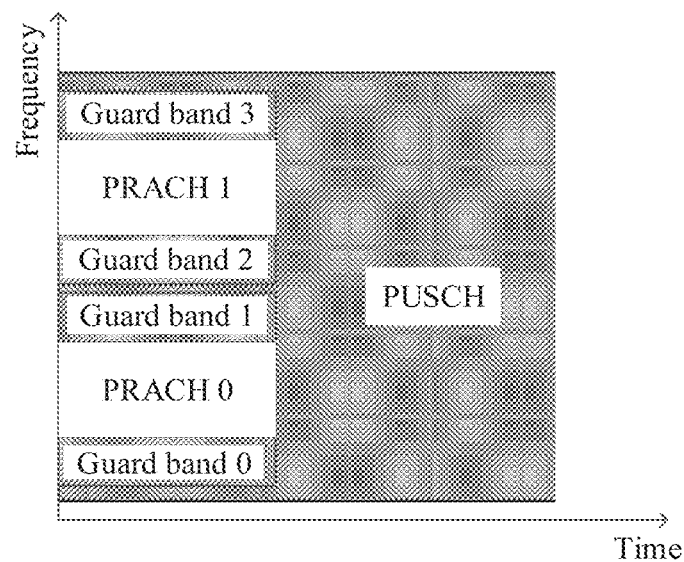
FIG. 3 is a schematic diagram of an example frequency band.

Optionally, in frequency domain, there may be one or more PRACHs. A case of one PRACH is shown in FIG. 1. The following describes a case of setting a guard band when there may be a plurality of PRACHs. For example, as shown in FIG. 2, the plurality of PRACHs may include two or more consecutive PRACHs, and guard bands are disposed at two ends of two consecutive PRACHs. For another example, as shown in FIG. 3, the plurality of PRACHs may include one or more discrete PRACHs, and guard bands are disposed at two ends of each of the one or more discrete PRACHs. For still another example, the plurality of PRACHs may include consecutive PRACHs, and may include discrete PRACHs.

For a quantity of guard subcarriers specified in the NR standard, refer to Table 1.

TABLE 1

| ZC sequence length | Subcarrier spacing of a PRACH | Subcarrier spacing of a PUSCH | $N_{RB}^{RA}$ | Subcarrier quantity |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |

Herein, $N_{RB}^{RA}$ is an RB quantity for indicating the PRACH by using the PUSCH.

With reference to Table 1, the following uses an example to describe a manner of determining a guard subcarrier in the conventional technologies. For example, a ZC sequence length is 839, a subcarrier spacing of the PRACH is 1.25 kHz, and a subcarrier spacing of the PUSCH is 15 kHz. It may be learned through querying the table that a corresponding quantity of guard subcarriers is 7, and a corresponding guard bandwidth is 8.75 kHz.

In a terrestrial network, a moving velocity of a terminal is relatively small relative to a moving velocity of a satellite. For example, the moving velocity of the terminal is 350 km/h, and a Doppler frequency shift generated by the terminal is 0.32 PPM. As described above, after a downlink frequency shift of the terminal is corrected, two times of the Doppler frequency shift in downlink still remains in uplink. To be specific, an uplink residual frequency shift corresponding to the terminal is 0.64 PPM. In an example of a 2G center frequency, a corresponding Doppler frequency shift is 1.28 kHz. For a specific calculation manner, refer to the conventional technologies. Details are not described herein. In other words, the guard bandwidth (8.75 kHz) can fully cover the Doppler frequency shift (1.28 kHz). In this case, uplink performance is not affected.

(2) The following briefly describes a satellite system.

A 5G network and a 5G evolved network in the future need to not only meet a plurality of service requirements, but also provide wider service coverage. Because satellite communication is less affected by geographical conditions and can implement global coverage, it is very important to develop the satellite communication. Especially when local basic communication facilities are severely damaged and cannot implement normal communication due to natural disasters, the satellite communication can effectively guarantee communication in disaster recovery. In addition, in some regions in which it is inconvenient to dispose a terrestrial base station, for example, the ocean, the desert, and the alpine, effective communication can be implemented through the satellite communication, to ensure full coverage of the communication.

Currently, satellite mobile communication systems may be classified into four types based on running orbits and heights (high, medium, and low) of satellites: (1) a low earth orbit (LEO) satellite system whose orbital height is 500 km to 2000 km; (2) a medium earth orbit (MEO) satellite system whose orbital height is 2000 km to 20000 km; (3) a high earth orbit (HEO) satellite system whose orbital height is greater than 20000 km and that has an elliptical orbit; (4) a geostationary earth orbit (GEO) satellite system whose orbital height is 35800 km.

The satellites are classified based on the orbits. Optionally, in addition, the satellite systems may be further classified based on whether satellite beams move with the satellites. In this way, the satellite communication system may be classified into a non-gaze satellite system and a gaze satellite system. The satellite beam of the non-gaze satellite system moves with the satellite. Each beam angle of the satellite does not change with time. Relatively frequent beam switching occurs at a fixed terrestrial point when the satellite flies over the point. A beam angle of the satellite in the gaze satellite system is adjusted in a specified manner. Continuous observation can be implemented for the fixed terrestrial point by using the satellite through switching of the beam angle.

A non-terrestrial network (NTN) is different from a terrestrial network. The non-terrestrial network includes but is not limited to a high base station (for example, a base station disposed on a hot-air balloon), a satellite, and the like. In the non-terrestrial network, a satellite is used as an example. In this case, a large relative moving velocity exists between the satellite and a terrestrial user, causing a large Doppler frequency shift. Even if the Doppler frequency shift is pre-compensated in a beam, a relatively large residual Doppler frequency shift still exists in uplink after a frequency shift is adjusted in downlink for the terminal. Therefore, in the NR standard, the guard bandwidth reserved in the PRACH channel cannot meet a requirement in an NTN scenario.

For the foregoing problem, this application proposes a method for determining a proper guard bandwidth. In this method, the interference problem between the PRACH and the PUSCH can be effectively resolved. In addition, this method may be applied to the terrestrial base station and the non-terrestrial base station, to improve diversity of application scenarios.

Figure 4:
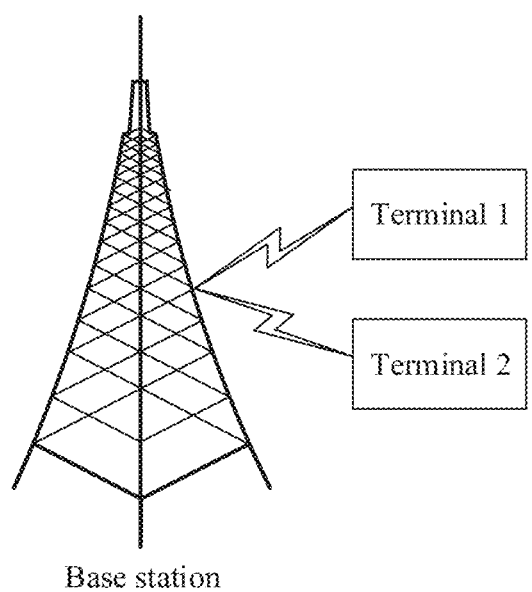
FIG. 4 is a schematic diagram of a structure of a communication system according to an embodiment of this application.

Before the technical solutions in the embodiments of this application are described, a communication system in the embodiments of this application is first described with reference to the accompanying drawings. FIG. 4 is a schematic diagram of a communication system according to an embodiment of this application. The communication system includes a base station, a terminal 1, and a terminal 2. It should be noted that in an actual application, there may be one or more base stations and one or more terminal devices. A quantity of base stations and a quantity of terminals in the communication system shown in FIG. 4 are merely adaptive examples. This is not limited in this application.

The communication system may be used to support a fourth generation (4G) access technology, for example, a long term evolution (LTE) access technology. Alternatively, the communication system may also support a fifth generation (5G) access technology, for example, an NR access technology. Alternatively, the communication system may be further used in a communication system that supports a plurality of wireless technologies, for example, an LTE technology and an NR technology. In addition, the communication system may be applied to a narrowband Internet of things (NB-IoT) system, an enhanced data rates for GSM evolution (EDGE) system, a wideband code division multiple access (WCDMA) system, a code division multiple access 2000 (CDMA 2000) system, a time division-synchronous code division multiple access (TD-SCDMA) system, an LTE system, and a future-oriented communication technology.

The terminal in FIG. 4 may be a device that provides voice or data connectivity for a user. For example, the terminal may also be referred to as a mobile station, a subscriber unit, a station, or terminal equipment (TE). The terminal may be a cellular phone, a personal digital assistant (PDA), a wireless modem, a handheld device, a laptop computer, a cordless phone, a wireless local loop (WLL) station, a tablet computer (pad), or the like. With development of wireless communication technologies, a device that can access a communication system, a device that can communicate with a network side in a communication system, or a device that can communicate with another object by using a communication system may be the terminal in this embodiment of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register. In this embodiment of this application, the terminal may communicate with a base station, for example, the base station in FIG. 4. A plurality of terminals may communicate with each other. The terminal may be stationary or mobile.

Figure 5A:
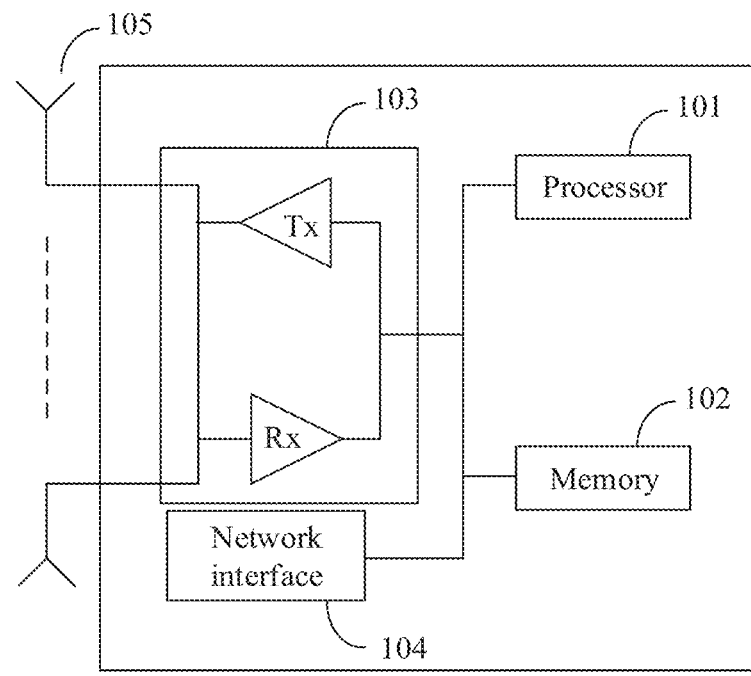
FIG. 5A is a schematic diagram of a structure of a base station according to an embodiment of this application.

FIG. 5A is a schematic diagram of a structure of a base station.

In FIG. 5A, the base station includes at least one processor 101, at least one memory 102, at least one transceiver 103, at least one network interface 104, and one or more antennas 105. The processor 101, the memory 102, the transceiver 103, and the network interface 104 are connected, for example, are connected through a bus. The antenna 105 is connected to the transceiver 103. The network interface 104 is configured to enable the base station to be connected to another communication device through a communication link. In the embodiments of this application, a connection may include various types of interfaces, transmission lines, buses, or the like. This is not limited in the embodiments.

A processor, for example, the processor 101, in the embodiments of this application may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 101 may be a single-core (single-CPU) processor or a multi-core (multi-CPU) processor. The at least one processor 101 may be integrated into one chip or located on a plurality of different chips.

A memory, for example, the memory 102, in the embodiments of this application may include at least one of the following types: a read-only memory (ROM), another type of static storage device that can store static information and instructions, a random access memory (RAM), another type of dynamic storage device that can store information and instructions, or an electrically erasable programmable read-only memory (EEPROM). In some scenarios, the memory may alternatively be a compact disc read-only memory (CD-ROM) or another compact disc storage medium, an optical disc storage medium (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited thereto.

The memory 102 may exist independently, and is connected to the processor 101. Optionally, the memory 102 may alternatively be integrated with the processor 101, for example, integrated into one chip. The memory 102 can store program code for performing the technical solutions in the embodiments of this application, and the processor 101 controls execution of the program code. Various types of program code to be executed may also be considered as drivers of the processor 101. For example, the processor 101 is configured to execute the program code stored in the memory 102, to implement the technical solutions in the embodiments of this application. Optionally, the memory 102 may be located outside a chip, and is connected to the processor 101 through an interface.

The transceiver 103 may be configured to support receiving or sending of a radio frequency signal between an access network device and a terminal, and the transceiver 103 may be connected to the antenna 105. The transceiver 103 includes a transmitter Tx and a receiver Rx. Specifically, the one or more antennas 105 may receive a radio frequency signal. The receiver Rx of the transceiver 103 is configured to: receive the radio frequency signal from the antenna, convert the radio frequency signal into a digital baseband signal or a digital intermediate frequency signal, and provide the digital baseband signal or the digital intermediate frequency signal for the processor 101, so that the processor 101 further processes the digital baseband signal or the digital intermediate frequency signal, for example, performs demodulating processing and decoding processing. In addition, the transmitter Tx of the transceiver 103 is further configured to: receive a modulated digital baseband signal or digital intermediate frequency signal from the processor 101, convert the modulated digital baseband signal or digital intermediate frequency signal into a radio frequency signal, and send the radio frequency signal through the one or more antennas 105. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

Optionally, the base station may be a terrestrial base station, or may be a non-terrestrial base station, for example, a high platform such as a satellite, a hot-air balloon that can implement functions of the base station, or a drone.

Figure 5B:
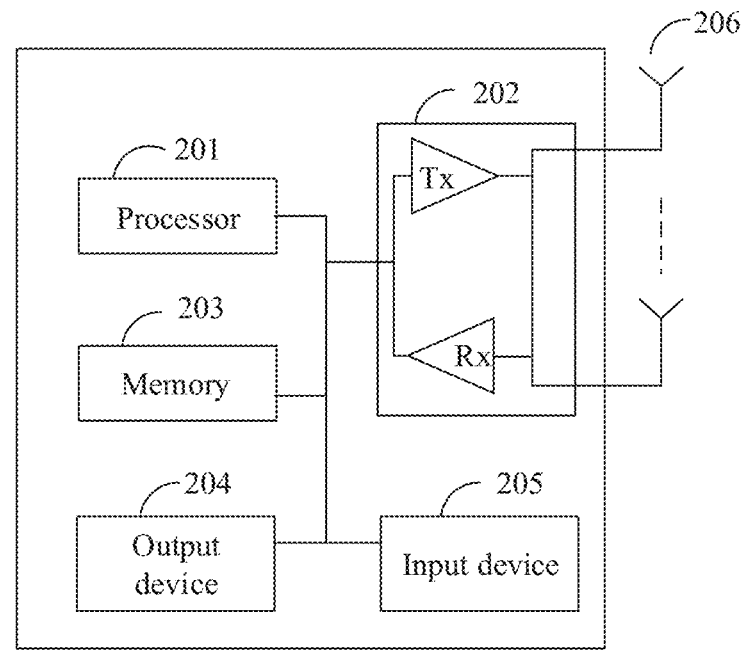
FIG. 5B is a schematic diagram of a structure of a terminal according to an embodiment of this application.

FIG. 5B is a schematic diagram of a structure of a terminal.

In FIG. 5B, the terminal includes at least one processor 201, at least one transceiver 202, and at least one memory 203. The processor 201, the memory 203, and the transceiver 202 are connected. Optionally, the terminal may further include an output device 204, an input device 205, and one or more antennas 206. The antenna 206 is connected to the transceiver 202, and the output device 204 and the input device 205 are connected to the processor 201.

For description of the transceiver 202, the memory 203, and the antenna 206, refer to the related description in FIG. 5A. Similar functions are implemented.

The processor 201 may be a baseband processor or a CPU. The baseband processor and the CPU may be integrated or separated.

The processor 201 may be configured to implement various functions for the terminal. For example, the processor 201 is configured to process a communication protocol and communication data; or is configured to control the entire terminal device, execute a software program, and process data of the software program; or is configured to assist in completing a computing processing task, for example, graphics, image, or audio processing. Alternatively, the processor 201 is configured to implement one or more of the foregoing functions.

The output device 204 communicates with the processor 201, and may display information in a plurality of manners. For example, the output device 204 may be a liquid crystal display (LCD), a light emitting diode (LED) display device, a cathode ray tube (CRT) display device, or a projector. The input device 205 communicates with the processor 201, and may receive user input in a plurality of manners. For example, the input device 205 may be a mouse, a keyboard, a touchscreen device, or a sensing device.

The memory 203 may exist independently, and is connected to the processor 201. Optionally, the memory 203 may alternatively be integrated with the processor 201, for example, integrated into one chip. The memory 203 can store program code for performing the technical solutions in the embodiments of this application, and the processor 201 controls execution of the program code. Various types of executed program code may also be considered as drivers of the processor 201. For example, the processor 201 is configured to execute the program code stored in the memory 203, to implement the technical solutions in the embodiments of this application. Optionally, the memory 203 may be located outside a chip, and is connected to the processor 201 through an interface.

With reference to the foregoing schematic diagram of the communication system shown in FIG. 4, the following describes specific implementation solutions of this application.

Specifically, in this application, a base station may obtain, based on a Doppler frequency shift of a beam, a quantity of guard subcarriers included in a guard band on a frequency band of the beam. Then, the base station may indicate a terminal to send a PUSCH on a first frequency band that includes at least one guard subcarrier. It should be noted that the transmission manner in this embodiment of this application may be applied to the transmission of the PUSCH, and may be further applied to transmission of a physical uplink control channel (PUCCH), a reference signal, a sounding reference signal (SRS), or another uplink channel. In other words, related steps such as a manner of determining a guard subcarrier included in a guard band in this application may also be applied to the transmission of the foregoing channel or signal, so that the foregoing channel in a transmission process can also meet application scenarios of the terrestrial base station and the non-terrestrial base station.

Figure 6:
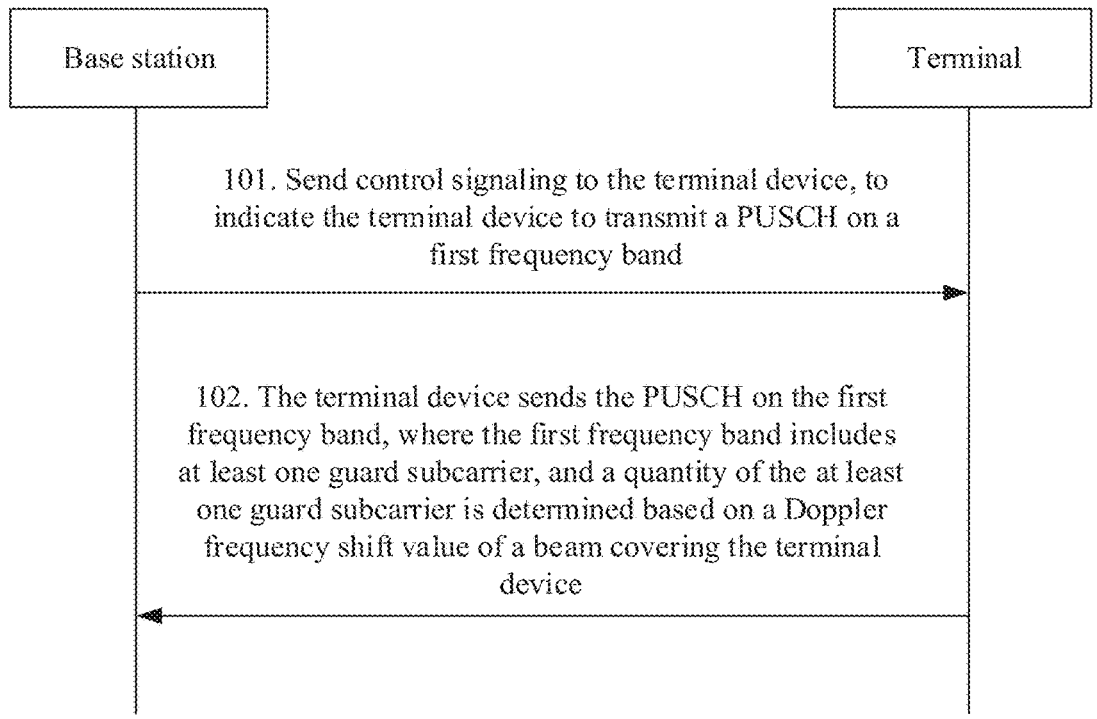
FIG. 6 is a schematic flowchart of a transmission method according to an embodiment of this application.

With reference to FIG. 4, FIG. 6 is a schematic flowchart of Embodiment 1 of a transmission method according to this application. As shown in FIG. 6, the method in this embodiment may include the following steps:

Step 101. A base station sends control signaling to a terminal device, to indicate the terminal device to send a PUSCH on a first frequency band.

Specifically, in this application, the base station may send the control signaling to a terminal (that is, the terminal device in this embodiment of this application, for example, a terminal 1), to indicate the terminal to send the PUSCH on the specified frequency band. Specific details of allocating the first frequency band to the terminal by the base station are described in detail in the following embodiment.

Optionally, the base station may further send a control indication to a terminal (for example, a terminal 2), to indicate the terminal 2 to send a PUSCH on a second frequency band. The first frequency band and the second frequency band are different, that is, the first frequency band and the second frequency band do not overlap. Optionally, the first frequency band and the second frequency band include at least one RB allocated by the base station to the terminal.

For example, the first frequency band allocated by the base station to the terminal 1 may include at least one guard subcarrier. In other words, the at least one RB in the first frequency band may include an RB to which the guard subcarrier belongs. Optionally, the second frequency band allocated by the base station to the terminal 2 may not include a guard subcarrier, or may include a guard subcarrier. It should be noted that, as described above, the first frequency band and the second frequency band do not overlap. Therefore, a location of the guard subcarrier included in the first frequency band and a location of the guard subcarrier included in the second frequency band are different in frequency domain. Specific details are described in the following embodiments.

Step 102: The base station receives the PUSCH sent by the terminal device on the first frequency band. The first frequency band includes at least one guard subcarrier. A quantity of the at least one guard subcarrier is determined based on a Doppler frequency shift of a beam covering the terminal device.

Specifically, the base station may receive a signal sent by the terminal device to the base station according to the control indication. In other words, the terminal (for example, the terminal 1) sends the PUSCH on the first frequency band, and the first frequency band includes the at least one guard subcarrier.

Specifically, in this application, the base station may send guard subcarrier information to the terminal. The guard subcarrier information is used to indicate a quantity of guard subcarriers included in a guard band on a frequency band corresponding to the beam covering the terminal. Optionally, the guard subcarrier information may be carried in the control signaling. The terminal may send the PUSCH on the first frequency band based on the guard subcarrier information and a location of the first frequency band. Optionally, the first frequency band includes at least one guard band. In other words, the terminal may determine the quantity of the at least one guard subcarrier and the location of the guard subcarrier on an RB resource after obtaining a quantity of guard subcarriers included in each guard band and information (including an RB quantity and an RB location) about the RB resource (that is, the RB included in the first frequency band) allocated by the base station to the terminal. For a specific manner of determining, refer to the conventional technologies. Details are not described in this application. In a transmission process, the terminal may perform puncturing processing on the guard subcarrier. To be specific, the terminal does not perform data mapping on the guard subcarrier, and performs data mapping only on a resource other than the guard subcarrier. In other words, the terminal sends the PUSCH on an RB resource other than the guard subcarrier in the first frequency band.

Optionally, before the base station sends the guard subcarrier information to the terminal, the base station obtains the guard subcarrier information corresponding to the beam covering the terminal. Specifically, the base station may calculate, based on the Doppler frequency shift of the beam, the quantity of guard subcarriers included in the guard band.

In a possible implementation, if the base station is a terrestrial base station and the base station keeps static, a factor that affects the Doppler frequency shift is mainly a moving velocity of the terminal device. Therefore, the base station may obtain the Doppler frequency shift of the beam based on the moving velocity of the terminal, and calculate, based on the frequency shift value, the quantity of guard subcarriers included in the guard band.

In a possible implementation, if the base station is a non-terrestrial base station, a factor that affects the Doppler frequency shift includes but is not limited to a height parameter of the base station and a beam parameter. The beam parameter includes but is not limited to at least one of the following: a beam location, a beam coverage radius, a beam center frequency, or a satellite height. The beam location is used to describe longitude and latitude of the beam. The base station may calculate the Doppler frequency shift of the beam based on the foregoing parameters, and obtain the corresponding quantity of guard subcarriers.

In a possible manner, the base station may divide m beams included in the base station, for example, divide the m beams into k beam sets, where each beam set includes at least one beam. Optionally, the base station may calculate a Doppler frequency shift corresponding to each beam in the set. Then, the base station may calculate a quantity of guard subcarriers (which may also be referred to as an average quantity of guard subcarriers) based on a beam corresponding to a maximum Doppler frequency shift in the set. In this case, the quantity of guard subcarriers may be used as a quantity of guard subcarriers corresponding to each beam in the set. For example, the base station divides the beam 1, the beam 2, and the beam 3 into the same set, and obtains through calculation that a Doppler frequency shift corresponding to the beam 3 is a maximum Doppler frequency shift in the set. The base station may calculate, based on the Doppler frequency shift of the beam 3, a quantity n of guard subcarriers corresponding to the beam 3, and sets the value n as a quantity of guard subcarriers corresponding to each beam in the set (that is, the beam 1, the beam 2, and the beam 3). In other words, if the beam covering the terminal is the beam 2, guard subcarrier information that is of the beam 2 and that is sent by the base station to the terminal is actually guard subcarrier information corresponding to the set to which the beam 2 belongs.

In a possible implementation, the base station may pre-calculate a quantity of guard subcarriers included in a guard band corresponding to each beam, that is, obtain guard subcarrier information corresponding to each beam. For example, the base station may determine, based on location information of the terminal device, the beam covering the terminal device, and send, to the terminal device, the guard subcarrier information corresponding to the beam covering the terminal device, that is, notify the terminal device of the quantity of guard subcarriers included in the guard band on the frequency band corresponding to the beam covering the terminal device. For another example, the base station sends, to the terminal, guard subcarrier information of all the beams included in the base station, that is, notifies the terminal of the quantity of guard subcarriers included in the guard band corresponding to each beam. For example, the base station may indicate information, that is, indicate the quantity of guard subcarriers included in the guard band corresponding to all the beams included in the base station. Optionally, the indication information may carry an ID of a beam and guard subcarrier information corresponding to the beam. With a movement of the base station and/or the terminal, the beam covering the terminal (which indicates a beam of the same base station) may change. When detecting that the beam covering the terminal changes, the terminal may obtain the beam ID of the beam covering the terminal. For a specific detection manner and a specific obtaining manner, refer to the conventional technologies. Details are not described in this application. The terminal may obtain, based on the indication information, the guard subcarrier information corresponding to the beam.

Optionally, this application further provides a manner of scheduling a guard subcarrier. The base station may determine, based on a status of a frequency band resource needed by the terminal, whether to allocate the frequency band including the guard subcarrier to the terminal. Specifically, if the base station detects that a size of the frequency band resource needed by the terminal is greater than a threshold, the base station may determine to allocate the frequency band including the guard subcarrier to the terminal. Optionally, the threshold may be set according to an actual requirement. For example, the threshold may be a quantity of scheduled subcarriers (that is, a quantity of subcarriers needed by the terminal)/a quantity of guard subcarriers >12, to determine that the frequency band including the guard subcarrier can be allocated to the terminal. It should be noted that the foregoing determining is merely determining whether the guard subcarrier can be allocated to the terminal. Actually, allocating the frequency band including the guard subcarrier to the terminal needs to be implemented according to an actual scheduling rule. For example, the frequency band including the guard subcarrier may be allocated to a terminal that needs a largest quantity of resources. This is not limited in this application.

In a possible implementation, if the resource needed by the terminal does not exceed the threshold, the base station does not schedule the frequency band including the guard subcarrier, that is, the base station does not allocate the frequency band including the guard subcarrier to any terminal.

In a possible implementation, optionally, the frequency band (for example, the first frequency band in this embodiment of this application) allocated by the base station to the terminal may include at least one guard band on the frequency band, for example, a guard band at one end of the PRACH. For another example, the frequency band may further include guard bands at two ends of the PRACH. For still another example, the quantity of at least one guard subcarrier included in the frequency band may be less than the quantity of guard subcarriers included in the guard band. For example, the guard bands at the two ends of the PRACH each include 130 guard subcarriers, and the first frequency band allocated by the base station to the terminal may include some guard subcarriers in the guard band at one end of the PRACH, for example, 10 guard subcarriers.

To make a person skilled in the art better understand the technical solutions of this application, the following uses several specific embodiments to describe the technical solutions in the foregoing method embodiment in detail.

Figure 7:
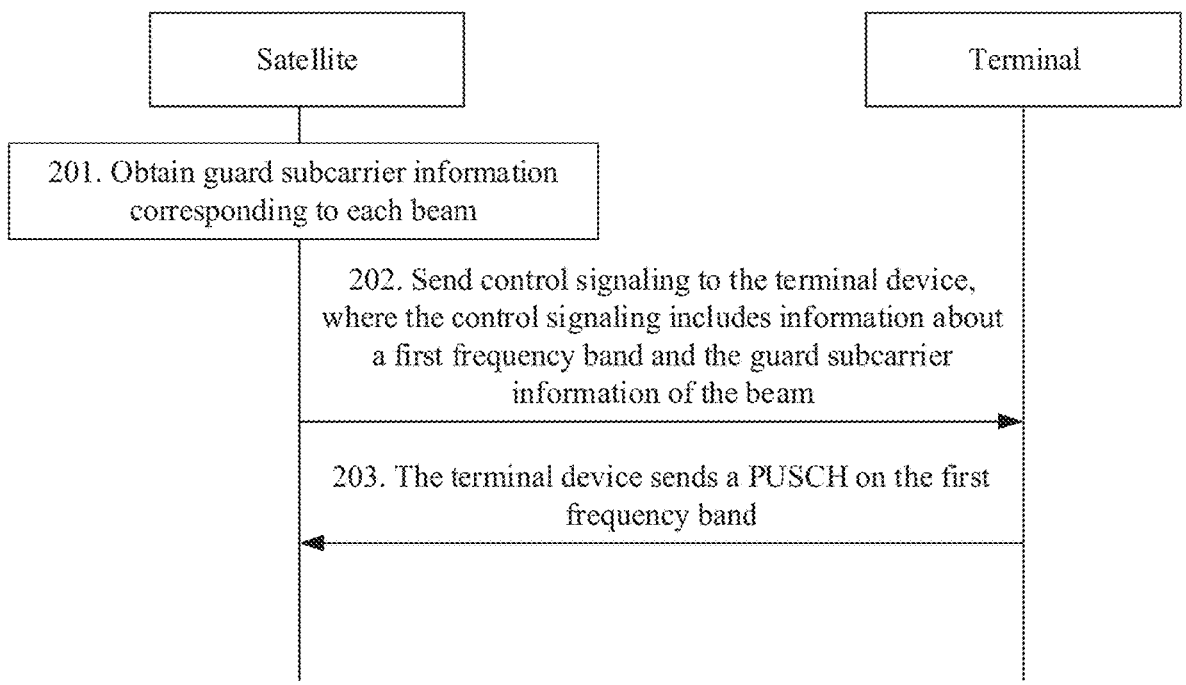
FIG. 7 is a schematic flowchart of a transmission method according to an embodiment of this application.

FIG. 7 is a schematic flowchart of Embodiment 2 of a transmission method according to this application. In this embodiment, description is provided by using an example in which a base station is a satellite. As shown in FIG. 7, the method in this embodiment may include the following steps:

Step 201: The satellite obtains guard subcarrier information corresponding to each beam.

Figure 8:
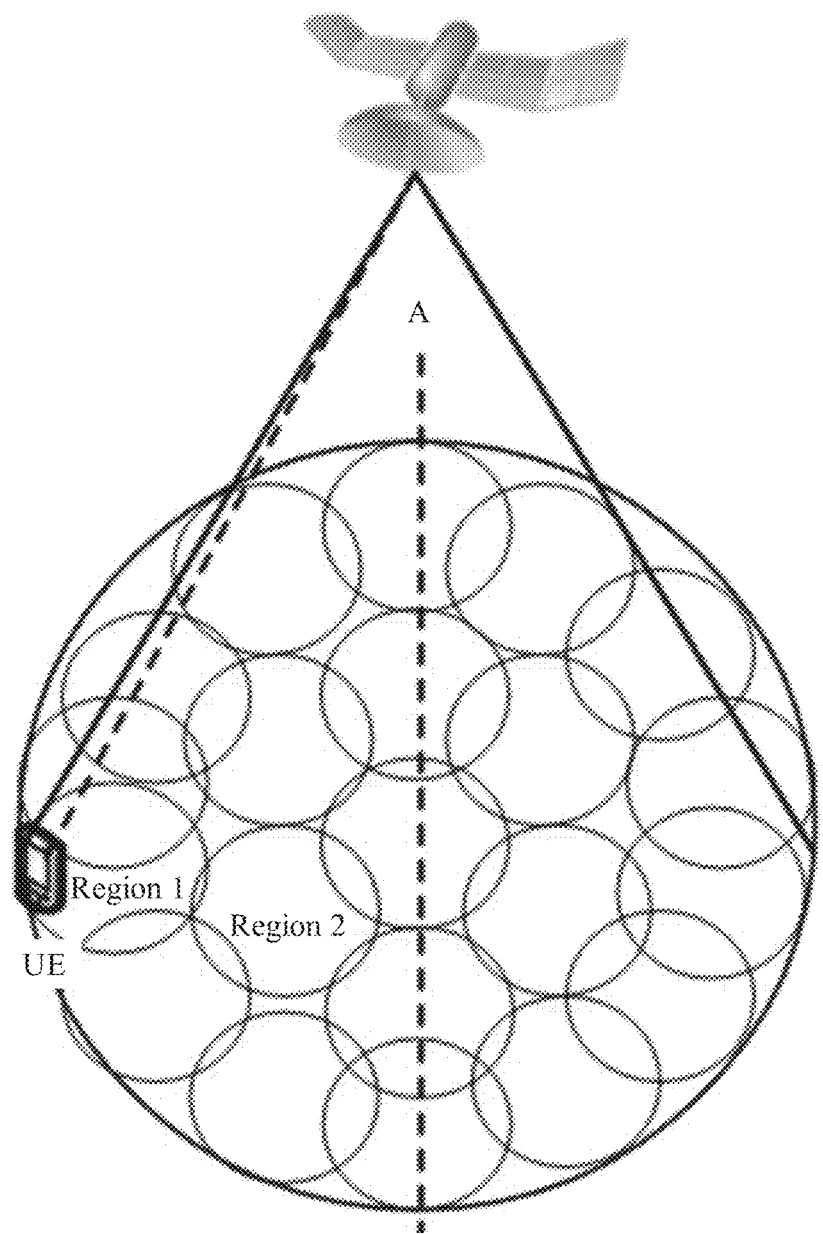
FIG. 8 is a schematic diagram of beam coverage of a satellite according to an embodiment of this application.

FIG. 8 is a schematic diagram of beam coverage of a satellite. In FIG. 8, the satellite may include a plurality of beams. After each beam is transmitted, a coverage region is formed. For example, after a beam whose beam ID is 1 (a beam 1 for short) in the satellite is transmitted, a coverage region is a region 1, and after a beam whose beam ID is 2 (a beam 2 for short) is transmitted, a coverage region is a region 2. It should be noted that the beam ID is identification information that is allocated by the satellite to each beam and that is used to distinguish between different beams. For a specific allocation manner, refer to the conventional technologies. This is not limited in this application.

It should be noted that different beams of the satellite correspond to different locations and different residual Doppler frequency shifts. Optionally, a factor affecting the Doppler frequency shift includes but is not limited to at least one of the following: a beam location, a beam coverage radius, a beam center frequency, and a satellite height. The beam location is used to describe longitude and latitude of the beam.

Figure 9:
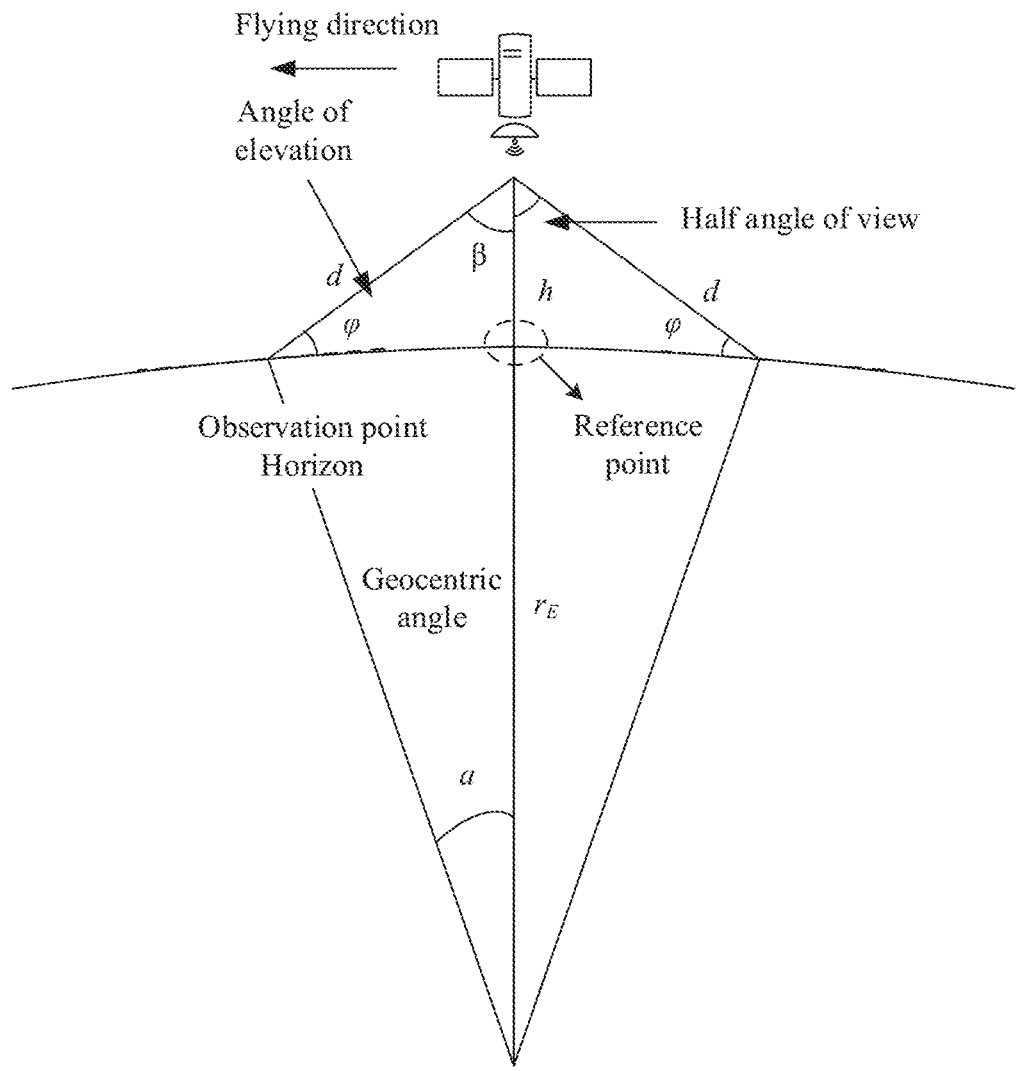
FIG. 9 is a schematic diagram of beam coverage of a satellite according to an embodiment of this application.

In this application, the satellite may calculate, based on the foregoing factor, a quantity of guard subcarriers included in a guard band corresponding to each beam. A specific calculation manner is as follows:

FIG. 9 shows a schematic diagram of an example of one of the beams of the satellite and a coverage region of the beam. The beam may also be referred to as an under-satellite beam. It should be noted that a calculation manner of another beam and a calculation manner of the beam are the same, where a difference there between is different parameters used in the two manners. A calculation manner of each beam is not described in detail in this application.

Optionally, for the same beam, with reference to FIG. 9, a coverage region after the beam is transmitted may be approximately a circular region. In this region, when a terminal is located on an edge of the region, a corresponding Doppler frequency shift has a maximum value in the region. Therefore, for the same beam, in this application, the Doppler frequency shift corresponding to the edge of the region may be calculated. The value may be understood as the maximum Doppler frequency shift in the region corresponding to the beam. In addition, a quantity of guard subcarriers of the beam is calculated based on the Doppler frequency shift.

(1) Calculate a distance D between the satellite and the edge of the region.

$$D = \sqrt{r_E^2 + (h+r_E)^2 - 2 \cdot r_E \cdot (h+r_E) \cdot \cos\alpha} \quad (1)$$

Herein, h is a height of the satellite from the ground, $r_E$ is a radius of the earth, $\alpha$ is a geocentric angle between the satellite and the edge of the beam coverage region.

(2) Calculate a relative moving velocity V between the terminal and the satellite.

$$\frac{D}{dt} = V = \frac{r_E \cdot (h+r_E) \cdot \sin\alpha}{\sqrt{r_E^2 + (h+r_E)^2 - 2 \cdot r_E \cdot (h+r_E) \cdot \cos\alpha}} \cdot \frac{d\alpha}{dt} \quad (2)$$

$$\omega_s = \frac{d\alpha}{dt} - \sqrt{\frac{\mu}{(r_E+h)^3}} \quad (3)$$

Herein, $\omega_s$ is an angular velocity of the satellite, and $\mu = 3.986 \times 10^5$ km³/s² is a Kepler constant.

(3) Calculate the Doppler frequency shift $d_r$ of the beam.

$$d_r = 2 \cdot \left(\frac{V}{c} - D_C\right) \cdot f_c \quad (4)$$

Herein, $f_c$ is a beam center frequency, and $D_C$ is a Doppler pre-compensation value. It should be noted that the Doppler pre-compensation value may be a Doppler frequency shift corresponding to any point in or out of the beam coverage region, for example, a tagged location in FIG. 9 (that is, a reference point tagged in the figure, also referred to as an under-satellite point). For a manner of calculating a Doppler frequency shift at this location, refer to the foregoing calculation formulas. Details are not described herein again.

(4) Calculate the quantity n of guard subcarriers of the beam.

$$n = d_r / \Delta f_{pusch} \quad (5)$$

Herein, n is the quantity of guard subcarriers in each guard band. In other words, as described above, there may be a plurality of PRACHs on the guard band, that is, there are two or more guard bands. The guard bands each include the same quantity of guard subcarriers. Herein, $\Delta f_{pusch}$ is a value of a subcarrier spacing of the PUSCH channel. It should be noted that the value of the subcarrier spacing of the PUSCH channel may be selected based on a requirement in the standard, for example, any one of 15 kHz, 30 kHz, 60 kHz, and 120 kHz in Table 1. For a specific selection manner, refer to the conventional technologies. Details are not described herein.

Optionally, for example, in the foregoing formulas in this application, for different beams of the same satellite, that is, in a case of a specific satellite height, different beam locations, beam radii, and beam center frequencies all cause different Doppler frequency shifts corresponding to the beam, and different corresponding quantities of guard subcarriers. Optionally, in this application, if different beams corresponding to different satellite heights correspond to different Doppler frequency shifts and different quantities of corresponding guard subcarriers.

Step 202: The satellite sends control signaling to the terminal device. The control signaling includes information about a first frequency band and the guard subcarrier information of the beam.

For example, as described above, after obtaining the guard subcarrier information corresponding to each beam, the satellite may send, to the terminal device accessing the satellite, the guard subcarrier information corresponding to each beam.

For another example, the satellite may alternatively determine, based on the location of the terminal device, the beam covering the terminal device; and send, to the terminal device, the guard subcarrier information corresponding to the beam. Optionally, the guard carrier information corresponding to all the beams or the guard carrier information corresponding to the beam covering the terminal may be carried in the control signaling, or may be sent to the terminal device before the control signaling is sent. This is not limited in this application.

Optionally, the satellite may schedule a resource in the scheduling manner described in Embodiment 1. Specifically, the satellite may determine, based on a quantity of RBs needed by the terminal device, whether to allocate an RB including a guard subcarrier to the terminal device. If the satellite determines to allocate the RB including the guard subcarrier to the terminal device, the satellite further determines, according to another allocation rule, whether to allocate a frequency band including a guard subcarrier to the terminal device. In other words, the satellite needs to determine, based on a requirement of the terminal device, whether the guard subcarrier can be allocated to the terminal; and then determine, according to an allocation rule in the conventional technologies, whether a frequency band (for example, the first frequency band in this embodiment of this application) allocated to the terminal device needs to include the guard subcarrier.

Optionally, the control signaling further includes the information about the first frequency band. The information includes but is not limited to a location (for example, a start location) of the first frequency band in frequency domain and a quantity of RBs included in the first frequency band. The control signaling is used to indicate the terminal device to send the PUSCH on the first frequency band.

In a possible implementation, the beam location may change with the satellite, that is, the non-gaze satellite described above. For this type of satellite, the beam location changes with the satellite for the earth. For the satellite, parameters such as the beam angle and the beam radius do not change. In other words, a Doppler frequency shift corresponding to a beam included in this type of satellite has a fixed value in a general case (for example, no special external interference exists or a parameter of the beam does not change). Therefore, a quantity of guard subcarriers included in a guard band corresponding to the beam is also a fixed value. Optionally, for this type of satellite, when the beam covering the terminal does not change, the satellite may send, to the terminal device, the guard subcarrier information corresponding to the beam only once.

Figure 10:
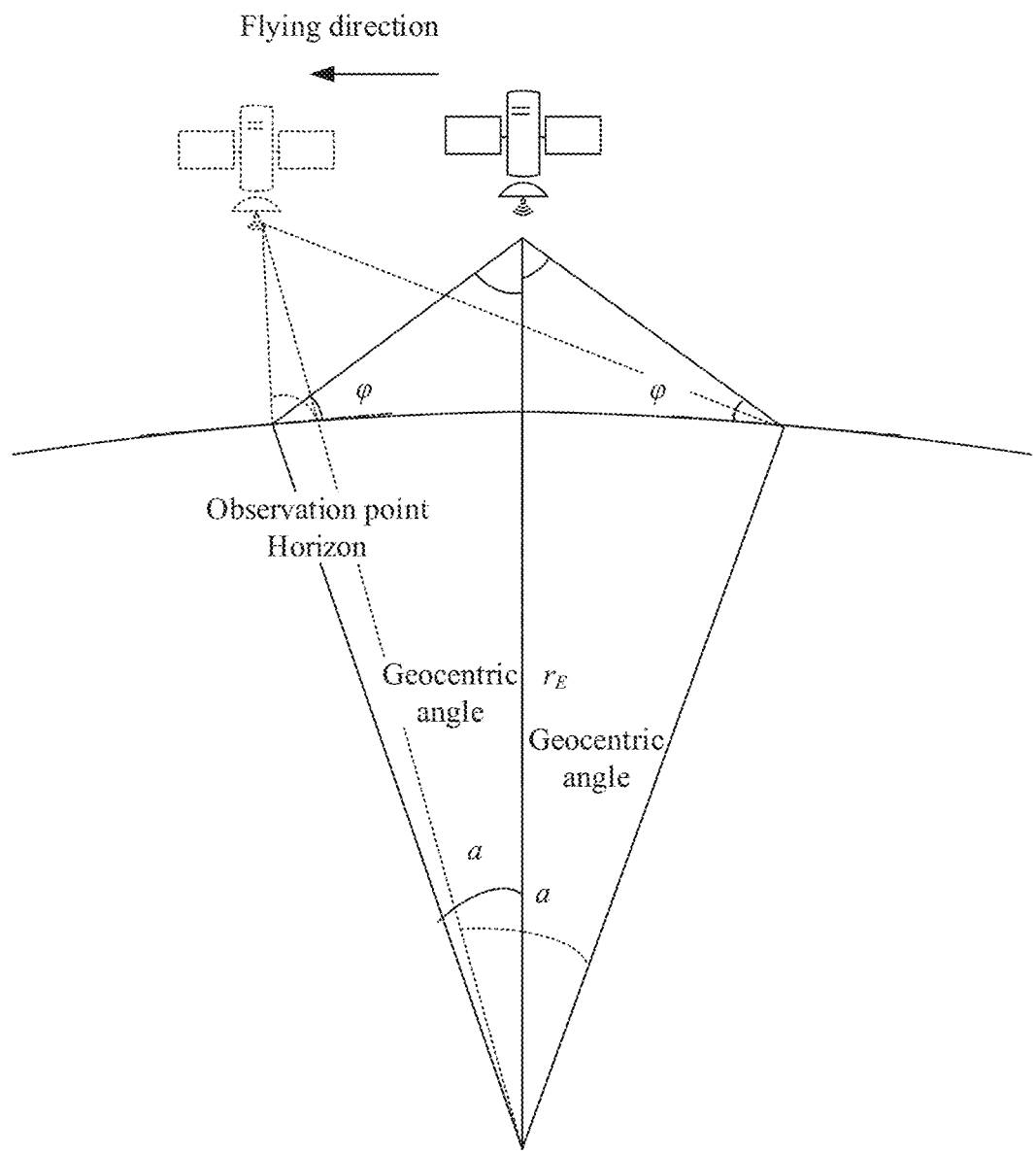
FIG. 10 is a schematic diagram of an example movement of a gaze satellite.

In a possible manner, the beam location may change with the satellite, that is, the gaze satellite described above. For this type of satellite, the beam location remains unchanged for the earth. However, as shown in FIG. 10, for the satellite, a relative location between the beam and the satellite changes with a movement of the satellite. Optionally, when a preset condition is triggered, the satellite may send, to the terminal, the quantity of guard subcarriers included in the guard band. For example, the preset condition may be a time period. To be specific, the satellite may set a time period (which may be set according to an actual requirement), and send the guard subcarrier information to the terminal after the time period is triggered. For another example, the preset condition may be a change value of the quantity of guard subcarriers of the beam. For example, the satellite may calculate, in real time, the quantity of guard subcarriers corresponding to the beam, and send the guard subcarrier information to the terminal when a change quantity of guard subcarriers of a beam exceeds a threshold (for example, more than two).

In another possible implementation, because the guard subcarrier information of the beam included in the non-gaze satellite does not change with the beam location, a guard subcarrier list may be generated after the satellite calculates the guard subcarrier information corresponding to each beam. The list includes a correspondence between the beam and the guard subcarrier. The beam may be identified by using a beam ID. Correspondingly, in the step in which the satellite sends the guard subcarrier information to the terminal, the satellite may obtain, through querying a table, the guard subcarrier information corresponding to the beam after obtaining the ID of the beam covering the terminal. Optionally, the satellite may further send the guard subcarrier list to the terminal, that is, send the guard subcarrier information corresponding to all the beams to the terminal. As described above, after obtaining the ID of the beam covering the terminal, the terminal may obtain, through querying the table, the guard subcarrier information corresponding to the beam.

Step 203: The terminal device sends the PUSCH on the first frequency band.

Specifically, after obtaining the information about the first frequency band and the guard subcarrier information corresponding to the beam covering the terminal, the terminal device may determine a resource that can be used to send the PUSCH on the first frequency band, that is, a subcarrier other than the guard subcarrier in the first frequency band (which may be referred to as an available subcarrier for short). The terminal device sends the PUSCH on the available subcarrier. Correspondingly, the satellite may receive the PUSCH that is sent by the terminal device on the available subcarrier.

Figure 11:
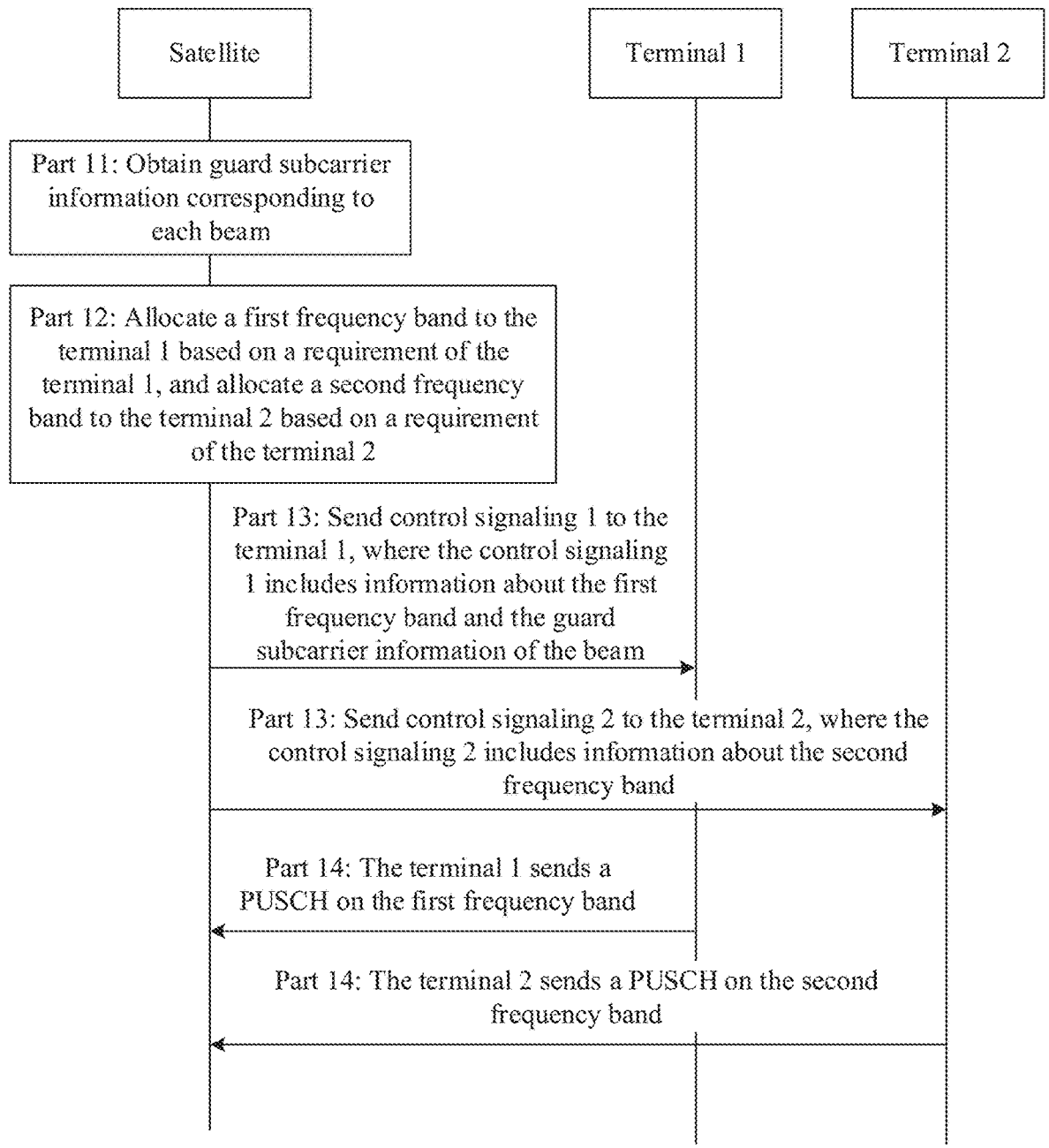
FIG. 11 is a schematic flowchart of an example transmission method.

Based on the embodiment shown in FIG. 7, FIG. 11 shows an example schematic flowchart of a transmission method.

In FIG. 11, Part 11. The satellite obtains the guard subcarrier information corresponding to each beam.

Specifically, the satellite calculates, based on a satellite height, a location of each beam, a coverage radius of each beam, a center frequency of each beam, and the like, the quantity of guard subcarriers included in the guard band corresponding to each beam.

In this embodiment, for example, in a configuration of a 3.5G frequency, a satellite height of 600 km, a radius of 100 km, an under-satellite beam (that is, the beam shown in FIG. 9), an uplink residual frequency shift of 28 kHz, a PRACH channel subcarrier spacing of 1.25 kHz, and a data channel subcarrier spacing of 15 kHz, the foregoing parameters are applied to Formula (1) to Formula (4) for calculation to obtain the quantity of guard subcarriers corresponding to the beam: n=28 kHz/15 kHz≠2. In addition, the terminal is located in a coverage region of the under-satellite beam.

Part 12: The satellite allocates a first frequency band to the terminal 1 based on a requirement of the terminal 1, and allocates a second frequency band to the terminal 2 based on a requirement of the terminal 2.

Optionally, in this embodiment, the satellite may obtain the requirement of the terminal 1 and that of the terminal 2, that is, a quantity of subcarriers needed by the terminal 1 and a quantity of subcarriers needed by the terminal 2. For a specific obtaining manner, refer to the conventional technologies. Details are not described herein.

Figure 12:
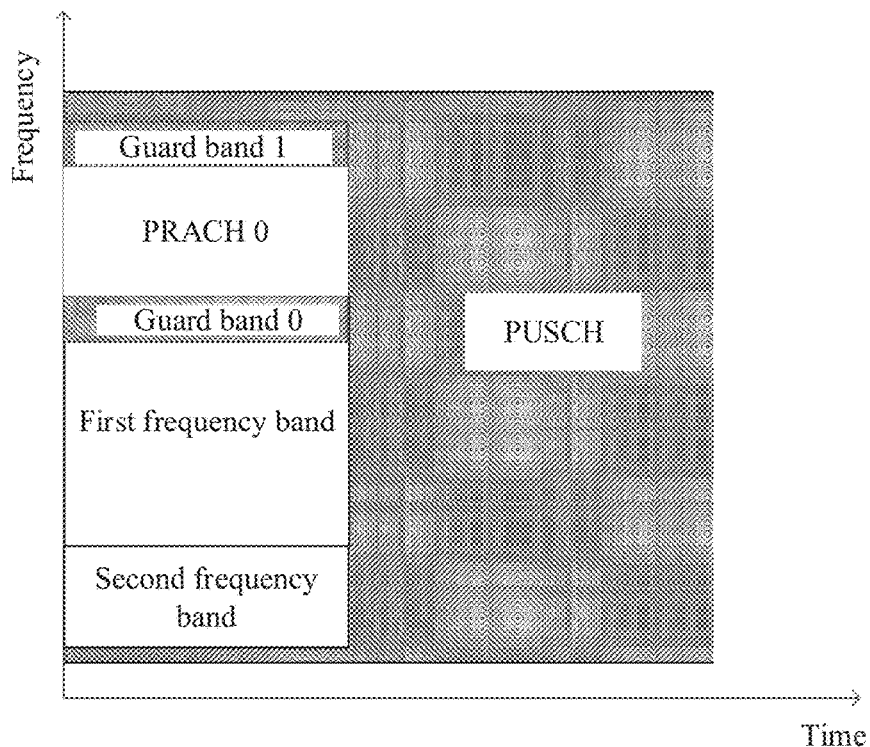
FIG. 12 is a schematic diagram of example resource allocation.

Optionally, in this embodiment, if the quantity of subcarriers needed by the terminal 1 exceeds a threshold, the satellite may determine that a frequency band including a guard subcarrier may be allocated to the terminal 1. For example, as shown in FIG. 12, the first frequency band allocated by the satellite to the terminal 1 includes 10 RBs.

The 10 RBs include 120 subcarriers. The first frequency band includes a guard band 0, that is, includes two guard subcarriers; and includes 118 subcarriers used by the terminal to send the PUSCH.

Optionally, in this embodiment, if the quantity of subcarriers needed by the terminal 2 does not exceed a threshold, the satellite determines that a frequency band including a guard subcarrier is not allocated to the terminal 2. For example, as shown in FIG. 12, the second frequency band allocated by the satellite to the terminal 2 includes one RB. The second frequency band includes 12 subcarriers, and does not include any guard subcarrier.

Part 13. The satellite sends control signaling 1 to the terminal 1, where the control signaling 1 includes information about the first frequency band and the guard subcarrier information of the beam; and the satellite sends control signaling 2 to the terminal 2, where the control signaling 2 includes information about the second frequency band.

Optionally, in this embodiment, the satellite sends the control signaling 1 to the terminal 1. The control signaling 1 is used to indicate the terminal 1 to send the PUSCH on the first frequency band. The control signaling 1 includes the information about the first frequency band, that is, a location (for example, a start location) of the first frequency band in frequency domain and a quantity of RBs included in the first frequency band; and the guard subcarrier information corresponding to the beam (that is, the under-satellite beam) currently covering the terminal, that is, a quantity of guard subcarriers included in each guard band.

Optionally, in this embodiment, the satellite sends the control signaling 2 to the terminal 2. The control signaling 2 is used to indicate the terminal 2 to send the PUSCH on the second frequency band. The signaling includes the information about the second frequency band, that is, a location (for example, a start location) of the second frequency band in frequency domain and a quantity of RBs included in the second frequency band.

Optionally, the control signaling 1 and the control signaling 2 may include the guard subcarrier information corresponding to all the beams included in the satellite.

Optionally, the control signaling 1 and the control signaling 2 may be carried in the same signaling. This is not limited in this application.

Part 14: The terminal 1 sends the PUSCH on the first frequency band, and the terminal 2 sends the PUSCH on the second frequency band.

Figure 13:
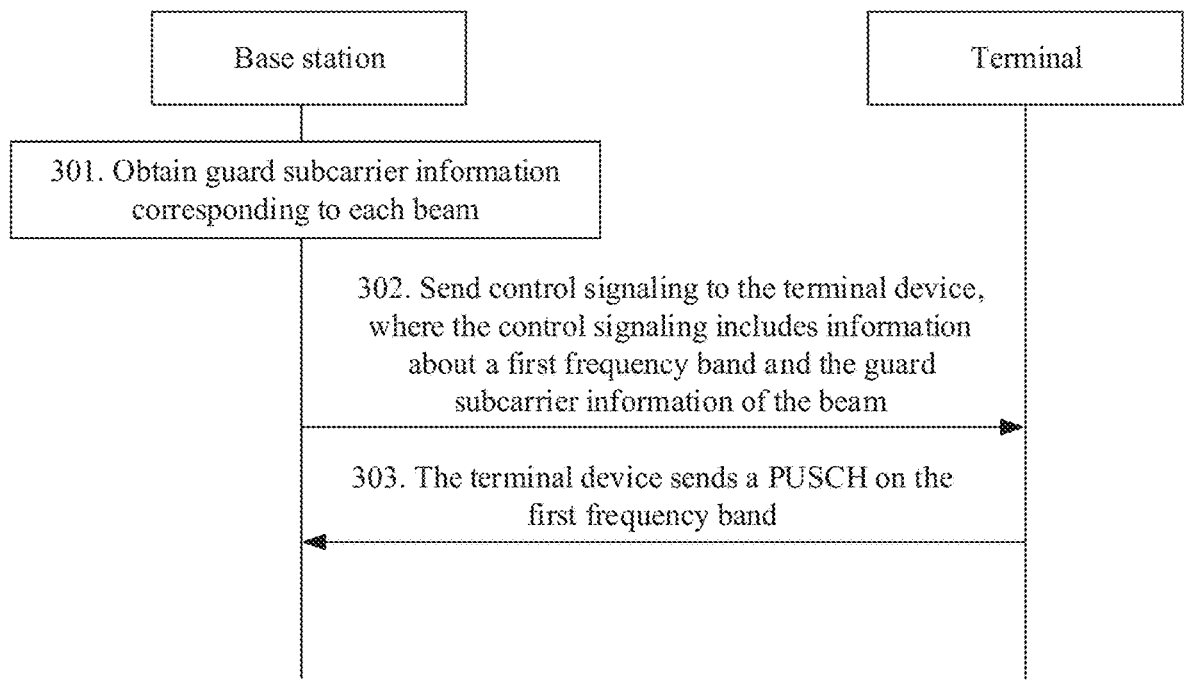
FIG. 13 is a schematic flowchart of a transmission method according to an embodiment of this application.

FIG. 13 is a schematic flowchart of Embodiment 3 of a transmission method according to this application. In this embodiment, description is provided by using an example in which a base station is a terrestrial base station. As shown in FIG. 13, the method in this embodiment may include the following steps:

Step 301: The base station obtains guard subcarrier information corresponding to each beam.

Specifically, for the terrestrial base station, a factor affecting a Doppler frequency shift is mainly a relative velocity between a terminal and the base station. Therefore, the base station may obtain the Doppler frequency shift $d_r$ according to the following formula:

$$d_r = 2 \cdot \frac{V}{c} \cdot f_c \qquad (6)$$

Herein, V is the relative velocity between the terminal and the base station, and is actually a velocity of the terminal.

In addition, the base station may calculate the quantity n of guard subcarriers of the beam according to Formula (5).

Step 302: The base station sends control signaling to a terminal device. The control signaling includes information about a first frequency band and the guard subcarrier information of the beam.

Step 303: The base station receives a PUSCH that is sent by the terminal device on the first frequency band.

For other details in this embodiment, refer to Embodiment 1 and Embodiment 2. Details are not described herein again.

In a possible implementation, a device that performs an operation of determining a quantity of guard subcarriers may be a control device or a terminal. For example, the control device may obtain guard subcarrier information corresponding to beams included in satellites at different heights. A specific calculation manner is the same as the equations applied in the scenario 1. Details are not described herein again. The control device may generate corresponding guard subcarrier lists for the satellites at the different heights. For example, a guard subcarrier list 1 is generated for a low earth orbit satellite A with a height of 1200 km. The guard subcarrier list 1 includes a beam ID and corresponding guard subcarrier information. The beam ID is an ID corresponding to a beam included in the low earth orbit satellite A. A guard subcarrier list 2 is generated for a low earth orbit satellite B with a height of 600 km. The guard subcarrier list 2 also includes a beam ID and corresponding guard subcarrier information. The control device may send the guard subcarrier list 1 and the guard subcarrier list 2 to the corresponding satellites, or send the guard subcarrier list 1 and the guard subcarrier list 2 to all terminals and all satellites. Subsequently, the satellite and/or the terminal may perform a subsequent PUSCH allocation and transmission process based on the steps described in the scenario 1. For another example, the terminal may obtain a satellite height, beam information (including a beam location, a beam coverage radius, and a beam center frequency). Then, the terminal may calculate, based on the foregoing parameters, the guard subcarrier information corresponding to the beam. A specific calculation manner is the same as that of the satellite. Details are not described herein again. Correspondingly, the control signaling sent by the satellite may not carry the guard subcarrier information. The terminal may determine, based on a result obtained through calculation, a quantity of guard subcarriers included in a frequency band allocated by the satellite to the terminal.

The foregoing mainly describes the solutions provided in the embodiments of this application from a perspective of interaction between network elements. It may be understood that, to implement the foregoing functions, the base station and the terminal include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

In the embodiments of this application, division into function modules of the base station and the terminal may be performed based on the foregoing method examples. For example, each function module may be obtained through division based on a corresponding function, or two or more functions may be integrated into one processing module. The integrated module may be implemented in a form of hardware, or may be implemented in a form of a software function module. It should be noted that module division in the embodiments of this application is an example, and is merely logical function division. During actual implementation, another division manner may be used.

Figure 14:
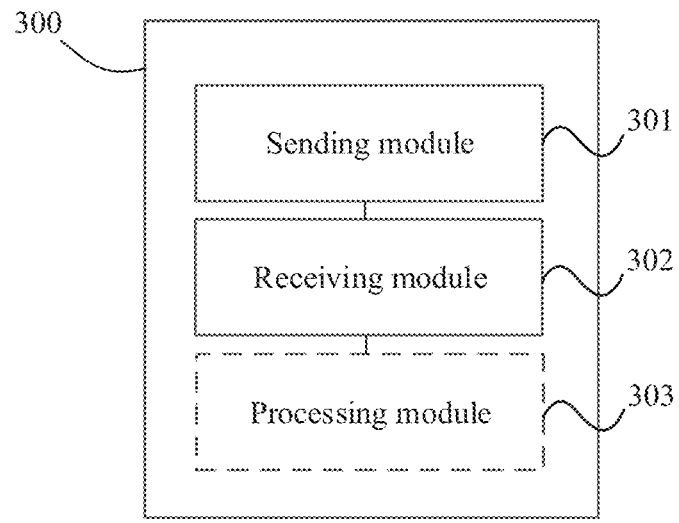
FIG. 14 is a schematic diagram of a structure of a base station according to an embodiment of this application.

When each function module is obtained through division based on a corresponding function, FIG. 14 is a possible schematic diagram of a structure of a base station 300 related to the foregoing embodiments. As shown in FIG. 14, the base station may include a sending module 301 and a receiving module 302. The sending module 301 is configured to send control signaling to a terminal device, to indicate the terminal device to send a PUSCH on a first frequency band. The receiving module 302 is configured to receive the PUSCH sent by the terminal device on the first frequency band. The first frequency band includes at least one guard subcarrier. A quantity of the at least one guard subcarrier is determined based on a Doppler frequency shift of a beam covering the terminal device.

In a possible implementation, a frequency band to which the first frequency band belongs includes m guard bands. Herein, m is an integer multiple of 2. The guard bands each include the same quantity of guard subcarriers. At least one guard band in the m guard bands comprises the at least one guard subcarrier.

In a possible implementation, the base station further includes a processing module 303, configured to obtain guard subcarrier information corresponding to the beam. The sending module 301 is further configured to send the guard subcarrier information to the terminal device. The guard subcarrier information is used to indicate the quantity of guard subcarriers included in the guard band.

In a possible implementation, the processing module 303 is further configured to: obtain the Doppler frequency shift of the beam, and obtain, based on the Doppler frequency shift of the beam, the quantity of guard subcarriers included in the guard band.

In a possible implementation, the processing module 303 is further configured to: obtain a Doppler frequency shift of each of k beams in a set to which the beam belongs, where k is an integer greater than or equal to 1; and calculate, based on a maximum value in the Doppler frequency shifts corresponding to the k beams in the set, the quantity of guard subcarriers included in the guard band.

In a possible implementation, if the base station is a non-terrestrial base station, that the processing module 303 is further configured to obtain the Doppler frequency shifts corresponding to the k beams in the set to which the beam belongs includes: obtaining height information of the base station and beam information of each of the k beams, where the beam information includes at least one of the following: a beam location, a beam coverage radius, and a beam center frequency, and the beam location is used to describe longitude and latitude of the beam; and calculating, based on the height information and the beam information, the Doppler frequency shift corresponding to each of the k beams.

In a possible implementation, the processing module 303 is further configured to calculate the Doppler frequency shift of the beam according to the following formulas:

$$D = \sqrt{r_E^2 + (h+r_E)^2 - 2 \cdot r_E \cdot (h+r_E) \cdot \cos\alpha}$$

$$\frac{D}{dt} = V = \frac{r_E \cdot (h+r_E) \cdot \sin\alpha}{\sqrt{r_E^2 + (h+r_E)^2 - 2 \cdot r_E \cdot (h+r_E) \cdot \cos\alpha}} \cdot \frac{d\alpha}{dt}$$

$$\omega_s = \frac{d\alpha}{dt} = \sqrt{\frac{\mu}{(r_E+h)^3}}$$

$$d_r = 2 \cdot \left(\frac{V_{max}}{c} - D_C\right) \cdot f_c$$

Herein, d is a distance between an edge of a beam coverage region and the base station, h is a height of the base station from the ground, $r_E$ is a radius of the earth, $\alpha$ is a geocentric angle between the base station and the edge of the beam coverage region, V is a relative velocity between the base station and the terminal in a beam, $\omega_s$ is an angular velocity of the base station, $\mu = 3.986 \times 10^5$ km³/s² is a Kepler constant, $d_r$ is the Doppler frequency shift, $f_c$ is the beam center frequency, and $D_C$ is a Doppler pre-compensation value.

In a possible implementation, the processing module 303 is further configured to calculate the quantity n of guard subcarriers included in the guard band according to the following formula:

$$n = d_{rmax} / \Delta f_{pusch}$$

Herein, $\Delta f_{pusch}$ is a subcarrier spacing of the PUSCH, and $d_{r\,max}$ is the maximum value in the Doppler frequency shifts corresponding to the k beams.

In a possible implementation, if the beam location does not change with a movement of the base station, the sending module 301 is further configured to: if a preset condition is triggered, send guard subcarrier information to the terminal device.

In a possible implementation, the processing module 303 is further configured to: detect that a size of a frequency band resource needed by the terminal device is greater than a threshold, and determine to allocate the first frequency band including the at least one subcarrier to the terminal device.

Figure 15:
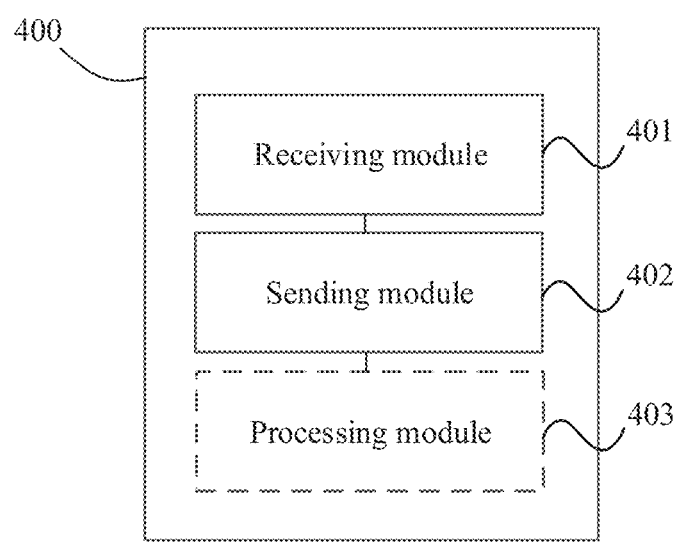
FIG. 15 is a schematic diagram of a structure of a terminal according to an embodiment of this application.

For another example, FIG. 15 is a possible schematic diagram of a structure of a terminal device 400 in the foregoing embodiments. As shown in FIG. 15, the terminal device 400 may include a receiving module 401 and a sending module 402. The receiving module 401 is configured to receive a control indication from a base station. The control indication is used to indicate the terminal device to send a PUSCH on a first frequency band. The first frequency band includes at least one guard subcarrier. A quantity of the at least one guard subcarrier is determined based on a Doppler frequency shift of a beam covering the terminal device. The first frequency band is located on a frequency band corresponding to the beam. The sending module 402 is configured to send the PUSCH on the first frequency band according to the control indication.

In a possible implementation, the frequency band includes m guard bands. Herein, m is an integer multiple of 2. The guard bands each include the same quantity of guard subcarriers. At least one guard band in the m guard bands comprises the at least one guard subcarrier.

In a possible implementation, the receiving module 401 is further configured to receive guard subcarrier information that corresponds to the beam and that is sent by the base station. The guard subcarrier information is used to indicate the quantity of guard subcarriers included in the guard band.

In a possible implementation, the control indication includes frequency band information of the first frequency band. The frequency band information is used to indicate a location of the first frequency band in the frequency band and a quantity of RB included in the first frequency band.

In a possible implementation, the terminal device further includes a processing module 403. The processing module 403 is configured to determine, based on the guard subcarrier information and the frequency band information, at least one subcarrier that can be used to send the PUSCH. The at least one subcarrier is a subcarrier other than the at least one guard subcarrier in the first frequency band. The sending module is configured to send the PUSCH on the at least one subcarrier.

The following describes an apparatus provided in an embodiment of this application.

Figure 16:
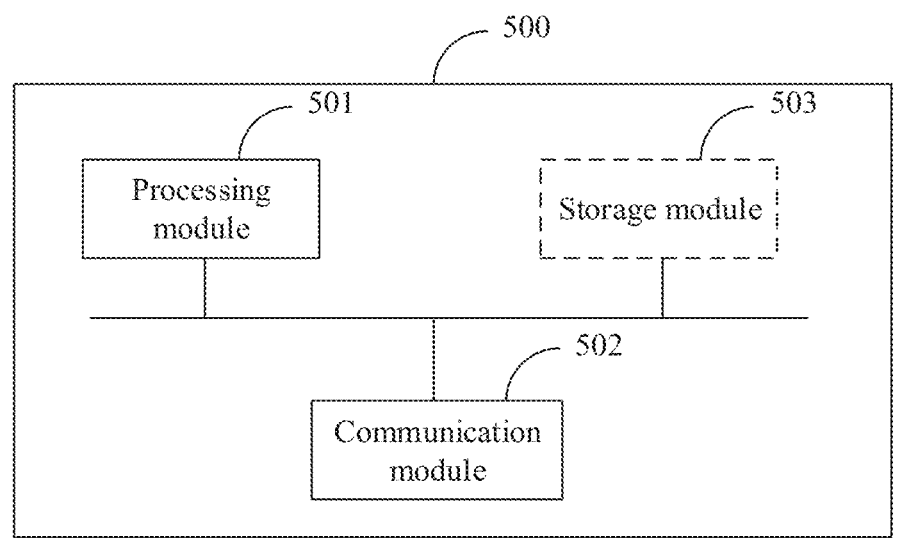
FIG. 16 is a schematic diagram of a structure of an apparatus according to an embodiment of this application.

As shown in FIG. 16, the apparatus includes a processing module 501 and a communication module 502. Optionally, the apparatus further includes a storage module 503. The processing module 501, the communication module 502, and the storage module 503 are connected through a communication bus.

The communication module 502 may be an apparatus having receiving and sending functions, and is configured to communicate with another network device or a communication network.

The storage module 503 may include one or more memories. The memory may be a component configured to store a program or data in one or more devices or circuits.

The storage module 503 may exist independently, and is connected to the processing module 501 through the communication bus. The storage module may alternatively be integrated with the processing module 501.

The apparatus 500 may be used in a network device, a circuit, a hardware component, or a chip.

The apparatus 500 may be the terminal in the embodiments of this application, for example, a terminal 1 or a terminal 2. A schematic diagram of the terminal may be shown in FIG. 5B. Optionally, the communication module 502 of the apparatus 500 may include an antenna and a transceiver of the terminal, for example, the antenna 206 and the transceiver 202 in FIG. 5B. Optionally, the communication module 502 may further include an output device and an input device, for example, the output device 204 and the input device 205 in FIG. 5B.

The apparatus 500 may be a chip in the terminal in the embodiments of this application. The communication module 502 may be an input/output interface, a pin, a circuit, or the like. Optionally, the storage module may store computer-executable instructions in a method on a terminal side, so that the processing module 501 performs the method on the terminal side in the foregoing embodiments. The storage module 503 may be a register, a cache, a RAM, or the like. The storage module 503 may be integrated with the processing module 501. The storage module 503 may be a ROM or another type of static storage device that can store static information and instructions. The storage module 503 may be independent of the processing module 501. Optionally, with development of wireless communication technologies, a transceiver may be integrated into the apparatus 500. For example, the transceiver 202 is integrated into the communication module 502.

When the apparatus 500 is the terminal or a chip in the terminal in the embodiments of this application, the apparatus 500 may implement the method performed by the terminal in the foregoing embodiments. Details are not described herein again.

The apparatus 500 may be the base station in the embodiments of this application. A schematic diagram of the base station may be shown in FIG. 5A. Optionally, the communication module 502 of the apparatus 500 may include an antenna and a transceiver of the base station, for example, the antenna 105 and the transceiver 103 in FIG. 5A. The communication module 502 may further include a network interface of the base station, for example, the network interface 104 in FIG. 5A.

The apparatus 500 may be a chip in the base station in the embodiments of this application. The communication module 502 may be an input/output interface, a pin, a circuit, or the like. Optionally, the storage module may store computer-executable instructions in a method on a base station side, so that the processing module 501 performs the method on the base station side in the foregoing embodiments. The storage module 503 may be a register, a cache, a RAM, or the like. The storage module 503 may be integrated with the processing module 501. The storage module 503 may be a ROM or another type of static storage device that can store static information and instructions. The storage module 503 may be independent of the processing module 501. Optionally, with development of wireless communication technologies, a transceiver may be integrated into the apparatus 500. For example, the transceiver 103 and the network interface 104 are integrated into the communication module 502.

When the apparatus 500 is the base station or a chip in the base station in the embodiments of this application, the method performed by the base station in the foregoing embodiments can be implemented.

This embodiment further provides an apparatus. The apparatus includes a logic circuit and an input/output interface. For example, if the apparatus is a base station, the logic circuit may be configured to support the base station in performing the related steps implemented by the base station in the foregoing embodiments. In addition, the logic circuit may control an input interface to receive a signal, and control an output interface to output a signal. For another example, if the apparatus is a terminal, the logic circuit may be configured to support the terminal in performing the related steps implemented by the terminal in the foregoing embodiments. In addition, the logic circuit may control an input interface to receive a signal, and control an output interface to output a signal.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or sent on the computer-readable medium. The computer-readable medium may include a computer storage medium and a communication medium, and may further include any medium that can transfer a computer program from one place to another. The storage medium may be any available medium accessible to a computer.

In an optional design, the computer-readable medium may include a RAM, a ROM, an EEPROM, a CD-ROM or another optical disc storage device, a magnetic disk storage device or another magnetic storage device, or any other medium that can be configured to carry or store required program code in a form of an instruction or a data structure and that may be accessed by the computer. In addition, any connection is appropriately referred to as a computer-readable medium. For example, if a coaxial cable, an optical fiber cable, a twisted pair, a digital subscriber line (DSL), or wireless technologies (such as infrared, radio, and microwave) are used to send software from a website, a server, or another remote source, the coaxial cable, the optical fiber cable, the twisted pair, the DSL, or the wireless technologies such as infrared, radio, and microwave are included in a definition of the medium. Magnetic disks and optical discs used in this specification include a compact disk (CD), a laser disk, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the foregoing computer program instructions are loaded and executed on a computer, the procedures or functions described in the foregoing method embodiments are all or partially generated. The computer may be a general-purpose computer, a dedicated computer, a computer network, a network device, user equipment, or another programmable apparatus.

The foregoing describes the embodiments of this application with reference to the accompanying drawings. However, this application is not limited to the foregoing specific implementations. The foregoing specific implementations are merely examples, and are not limitative. Inspired by this application, a person of ordinary skill in the art may further make many modifications without departing from the purposes of this application and the protection scope of the claims, and all the modifications shall fall within the protection scope of this application.

What is claimed is:

1. A transmission method performed by a base station, wherein the method comprises:
   sending control signaling to a terminal device, to indicate the terminal device to send a physical uplink shared channel (PUSCH) on a first frequency band;
   receiving, from the terminal device, the PUSCH on the first frequency band, wherein the first frequency band comprises at least one guard subcarrier, a quantity of the at least one guard subcarrier is determined based on a Doppler frequency shift of a beam covering the terminal device, and the first frequency band is located on a frequency band corresponding to the beam, wherein the frequency band comprises m guard bands, each of the m guard bands comprises the same quantity of guard subcarriers, and at least one guard band in the m guard bands comprises the at least one guard subcarrier;
   obtaining guard subcarrier information corresponding to the beam; and
   sending the guard subcarrier information to the terminal device, wherein the guard subcarrier information indicates the quantity of guard subcarriers comprised in the guard band.

2. The method according to claim 1, wherein obtaining the guard subcarrier information corresponding to the beam comprises:
   obtaining the Doppler frequency shift of the beam; and
   obtaining, based on the Doppler frequency shift of the beam, the quantity of guard subcarriers comprised in the guard band.

3. The method according to claim 2, wherein obtaining the quantity of guard subcarriers comprised in the guard band comprises:
   obtaining a Doppler frequency shift of each of k beams in a set to which the beam belongs, wherein k is an integer greater than or equal to 1; and
   calculating, based on a maximum value in Doppler frequency shifts corresponding to the k beams in the set, the quantity of guard subcarriers comprised in the guard band.

4. The method according to claim 3, wherein the base station is a non-terrestrial base station, obtaining the Doppler frequency shifts of each of k beams in a set to which the beam belongs comprises:
   obtaining height information of the base station and beam information of each of the k beams, wherein the beam information of each of the k beams comprises at least one of a beam location, a beam coverage radius, and a beam center frequency, and the beam location describes longitude and latitude of the beam; and
   calculating, based on the height information and the beam information, the Doppler frequency shift corresponding to each of the k beams.

5. The method according to claim 4, wherein the Doppler frequency shift of the beam is calculated according to the following equations:

$$D = \sqrt{r_E^2 + (h+r_E)^2 - 2 \cdot r_E \cdot (h+r_E) \cdot \cos\alpha} \quad (1)$$

$$\frac{D}{dt} = V = \frac{r_E \cdot (h+r_E) \cdot \sin\alpha}{\sqrt{r_E^2 + (h+r_E)^2 - 2 \cdot r_E \cdot (h+r_E) \cdot \cos\alpha}} \cdot \frac{d\alpha}{dt} \quad (2)$$

$$\omega_s = \frac{d\alpha}{dt} = \sqrt{\frac{\mu}{(r_E + h)^3}} \quad (3)$$

$$d_r = 2 \cdot \left(\frac{V_{max}}{c} - D_C\right) \cdot f_c \quad (4)$$

wherein d is a distance between an edge of a beam coverage region and the base station, h is a height of the base station from the ground, $r_E$ is a radius of the earth, $\alpha$ is a geocentric angle between the base station and the edge of the beam coverage region, V is a relative velocity between the base station and the terminal device, $\omega$ is an angular velocity of the base station, $\mu = 3.986 \times 10^5$ km$^3$/s$^2$ is a Kepler constant, $d_r$ is the Doppler frequency shift, $f_c$ is the beam center frequency, and $D_c$ is a Doppler pre-compensation value.

6. The method according to claim 5, wherein a quantity n of guard subcarriers comprised in the guard band is calculated according to the following equations:

$$n = d_{r\,max} / \Delta f_{pusch} \quad (5)$$

wherein $\Delta f_{pusch}$ is a subcarrier spacing of the PUSCH, and $d_{r\,max}$ is the maximum value in the Doppler frequency shifts corresponding to the k beams.

7. The method according to claim 4, wherein the beam location does not change with a movement of the base station, the method further comprises:
   in response to determining that a preset condition is triggered, sending the guard subcarrier information to the terminal device.

8. The method according to claim 1, wherein before sending control signaling to the terminal device, the method comprises:
   determining that a size of a frequency band resource needed by the terminal device is greater than a threshold; and
   determining to allocate the first frequency band comprising at least one subcarrier to the terminal device.

9. A transmission apparatus, wherein the transmission apparatus is applied to a base station, comprising:
   at least one processor; and
   at least one non-transitory memory including programming instructions, when executed by the at least one processor, cause the transmission apparatus to:
      send control signaling to a terminal device, to indicate the terminal device to send a physical uplink shared channel (PUSCH) on a first frequency band;
      receive, from the terminal device, the PUSCH on the first frequency band, wherein the first frequency band comprises at least one guard subcarrier, a quantity of the at least one guard subcarrier is determined based on a Doppler frequency shift of a beam covering the terminal device, and the first frequency band is located on a frequency band corresponding to the beam, wherein the frequency band comprises m guard bands, each of the m guard bands comprises the same quantity of guard subcarriers, and at least one guard band in the m guard bands comprises the at least one guard subcarrier;
      obtain guard subcarrier information corresponding to the beam; and
      send the guard subcarrier information to the terminal device, wherein the guard subcarrier information indicates the quantity of guard subcarriers comprised in the guard band.

10. The transmission apparatus of claim 9, wherein obtaining the guard subcarrier information corresponding to the beam comprises:
    obtaining the Doppler frequency shift of the beam; and
    obtaining, based on the Doppler frequency shift of the beam, the quantity of guard subcarriers comprised in the guard band.

11. The transmission apparatus of claim 10, wherein obtaining the quantity of guard subcarriers comprised in the guard band comprises:
    obtaining a Doppler frequency shift of each of k beams in a set to which the beam belongs, wherein k is an integer greater than or equal to 1; and
    calculating, based on a maximum value in Doppler frequency shifts corresponding to the k beams in the set, the quantity of guard subcarriers comprised in the guard band.

12. The transmission apparatus of claim 11, wherein the base station is a non-terrestrial base station, and obtaining the Doppler frequency shifts of each of k beams in a set to which the beam belongs comprises:
    obtaining height information of the base station and beam information of each of the k beams, wherein the beam information of each of the k beams comprises at least one of a beam location, a beam coverage radius, and a beam center frequency, and the beam location describes longitude and latitude of the beam; and
    calculating, based on the height information and the beam information, the Doppler frequency shift corresponding to each of the k beams.

13. The transmission apparatus of claim 12, wherein the Doppler frequency shift of the beam is calculated according to the following equations:

$$D = \sqrt{r_E^2 + (h + r_E)^2 - 2 \cdot r_E \cdot (h + r_E) \cdot \cos\alpha} \quad (1)$$

$$\frac{D}{dt} = V = \frac{r_E \cdot (h + r_E) \cdot \sin\alpha}{\sqrt{r_E^2 + (h + r_E)^2 - 2 \cdot r_E \cdot (h + r_E) \cdot \cos\alpha}} \cdot \frac{d\alpha}{dt} \quad (2)$$

$$\omega_s = \frac{d\alpha}{dt} = \sqrt{\frac{\mu}{(r_E + h)^3}} \quad (3)$$

$$d_r = 2 \cdot \left(\frac{V_{max}}{c} - D_C\right) \cdot f_c \quad (4)$$

wherein d is a distance between an edge of a beam coverage region and the base station, h is a height of the base station from the ground, $r_E$ is a radius of the earth, $\alpha$ is a geocentric angle between the base station and the edge of the beam coverage region, V is a relative velocity between the base station and the terminal device, $\omega$, is an angular velocity of the base station, $\mu=3.986\times10^5$ km$^3$/s$^2$ is a Kepler constant, $d_r$ is the Doppler frequency shift, $f_c$ is the beam center frequency, and $D_c$ is a Doppler pre-compensation value.

14. The transmission apparatus of claim 13, wherein a quantity n of guard subcarriers comprised in the guard band is calculated according to the following equations:

$$n = d_{r\,max} / \Delta f_{pusch} \quad (5)$$

wherein $\Delta f_{pusch}$ is a subcarrier spacing of the PUSCH, and $d_{r\,max}$ is the maximum value in the Doppler frequency shifts corresponding to the k beams.

15. The transmission apparatus of claim 12, wherein the beam location does not change with a movement of the base station, the programming instructions, when executed by the at least one processor, cause the transmission apparatus to:
    in response to determining that a preset condition is triggered, send the guard subcarrier information to the terminal device.

16. The transmission apparatus of claim 9, wherein before sending control signaling to the terminal device, the programming instructions, when executed by the at least one processor, cause the transmission apparatus to:
    determine that a size of a frequency band resource needed by the terminal device is greater than a threshold; and
    determine to allocate the first frequency band comprising at least one subcarrier to the terminal device.

* * * * *

UNITED STATES PATENT AND TRADEMARK OFFICE
CERTIFICATE OF CORRECTION

PATENT NO. : 12,108,375 B2
APPLICATION NO. : 17/704555
DATED : October 1, 2024
INVENTOR(S) : Jianwei Zhou et al.

It is certified that error appears in the above-identified patent and that said Letters Patent is hereby corrected as shown below:

In the Claims

In Column 30, In Line 55 (Approx.), In Claim 5, delete "$\omega$" and insert -- $\omega_s$ --.

In Column 32, In Line 34, In Claim 13, delete "$\omega$," and insert -- $\omega_s$ --.

Signed and Sealed this
Eleventh Day of February, 2025

Coke Morgan Stewart
*Acting Director of the United States Patent and Trademark Office*